(12) United States Patent
Kitaura et al.

(10) Patent No.: US 11,542,581 B2
(45) Date of Patent: Jan. 3, 2023

(54) TITANIUM PRODUCT AND METHOD FOR PRODUCING THE SAME

(71) Applicant: NIPPON STEEL & SUMITOMO METAL CORPORATION, Tokyo (JP)

(72) Inventors: Tomoyuki Kitaura, Tokyo (JP); Yoshihisa Shirai, Tokyo (JP); Hideki Fujii, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 241 days.

(21) Appl. No.: 16/082,289

(22) PCT Filed: Mar. 9, 2017

(86) PCT No.: PCT/JP2017/009619
§ 371 (c)(1),
(2) Date: Sep. 5, 2018

(87) PCT Pub. No.: WO2017/155072
PCT Pub. Date: Sep. 14, 2017

(65) Prior Publication Data
US 2019/0032183 A1   Jan. 31, 2019

(30) Foreign Application Priority Data

Mar. 11, 2016   (JP) .............................. JP2016-048341

(51) Int. Cl.
*C22F 1/18* (2006.01)
*C22C 14/00* (2006.01)
(Continued)

(52) U.S. Cl.
CPC ............ *C22F 1/183* (2013.01); *B21D 22/022* (2013.01); *B32B 15/01* (2013.01); *C22C 1/08* (2013.01);
(Continued)

(58) Field of Classification Search
CPC ..... B32B 15/01; B32B 15/016; B32B 15/017; B32B 5/18; B22F 7/02–08;
(Continued)

(56) References Cited

U.S. PATENT DOCUMENTS 3,608,183 A * 9/1971 Lemelson ............... C22C 47/08
                                                          29/527.7
4,137,616 A   2/1979 Veitl et al.
(Continued)

FOREIGN PATENT DOCUMENTS

CN   100414746   8/2008
CN   103008634   4/2013
(Continued)

OTHER PUBLICATIONS

Osaka Titanium, "Titanium Compositions", May 14, 2015, https://www.osaka-ti.co.jp/e/e_product/pdf/table_e.pdf, retrieved Jul. 24, 2020 using wayback machine (Year: 2015).*
(Continued)

*Primary Examiner* — Kevin E Yoon
*Assistant Examiner* — Austin Pollock
(74) *Attorney, Agent, or Firm* — Clark & Brody LP

(57) ABSTRACT

A titanium product includes an inner layer portion and a surface layer portion joined to the inner layer portion. The surface layer portion has a composition consisting of, by mass %, O: 0.4% or less, Fe: 0.5% or less, Cl: 0.020% or less, the balance: Ti and impurities. The inner layer portion 3 has pores and a composition consisting of, by mass %, O: 0.4% or less, Fe: 0.5% or less, Cl: more than 0.020% and 0.60%, the balance: Ti and impurities. The area fraction of the pores in the inner layer portion in a cross-section perpendicular to the longitudinal direction of the titanium product is more than 0% and not more than 30%. The Cl content ($Cl_I$) of the inner layer portion, a thickness ($t_S$) of the
(Continued)

surface layer portion, and a thickness ($t_I$) of the inner layer portion satisfy the expression [$Cl_I \leq 0.03 + 0.02 \times t_S/t_I$].

6 Claims, 4 Drawing Sheets

(51) Int. Cl.
    *B32B 15/01*     (2006.01)
    *C22C 1/08*     (2006.01)
    *B21D 22/02*     (2006.01)
    *B21B 1/02*     (2006.01)
    *B21B 3/00*     (2006.01)
    *B23K 20/02*     (2006.01)
    *B22F 7/02*     (2006.01)
    *B22F 7/00*     (2006.01)

(52) U.S. Cl.
CPC ............... *C22C 14/00* (2013.01); *B21B 1/02* (2013.01); *B21B 3/00* (2013.01); *B22F 7/004* (2013.01); *B22F 7/02* (2013.01); *B23K 20/021* (2013.01); *B23K 20/023* (2013.01); *C22C 2204/00* (2013.01)

(58) Field of Classification Search
CPC ............. B22F 2998/10; B22F 2999/00; B22F 3/1125; B22F 3/15; B22F 7/006; B22F 3/1208; B22F 3/1216; B22F 3/16; B22F 3/18; B22F 2201/20; B22F 3/02; B22F 3/17; B22F 1/0003; B22F 2998/00; B22F 2003/1128; B22F 3/04; B22F 3/045; B22F 3/10; B22F 3/1007; B22F 3/20; B22F 5/02; B22F 8/00; B22F 7/00–08; C22C 14/00; C22C 1/0458; C22C 1/08; C22C 2204/00; Y10T 29/4998; Y10T 29/49993; Y10T 428/12479; Y10T 428/12021; Y10T 428/12042; Y10T 428/12069; B21B 1/02; B21B 3/00; B21D 22/022; B23K 20/02; B23K 20/023; B23K 20/2336; B23P 15/00; C22B 1/248; C22B 34/12; C22F 1/183; Y02P 10/24
See application file for complete search history.

(56) References Cited

U.S. PATENT DOCUMENTS

| | | | | | |
|---|---|---|---|---|---|
| 4,358,892 | A | * | 11/1982 | Turillon | H01M 4/14 29/623.1 |
| 5,034,186 | A | * | 7/1991 | Shimamune | B22F 7/004 419/9 |
| 5,207,776 | A | * | 5/1993 | Pearce | B22D 19/16 164/332 |
| 5,564,064 | A | | 10/1996 | Martin | |
| 5,579,988 | A | * | 12/1996 | Schutz | B23K 20/04 228/186 |
| 5,972,521 | A | | 10/1999 | Huskamp et al. | |
| 6,085,965 | A | * | 7/2000 | Schwartz | B22F 7/006 228/190 |
| 2002/0119068 | A1 | * | 8/2002 | Abkowitz | C22B 1/248 419/42 |
| 2003/0115730 | A1 | * | 6/2003 | Ament | B22F 7/04 29/17.3 |
| 2004/0081571 | A1 | * | 4/2004 | Vatchiants | B22F 8/00 419/2 |
| 2004/0209107 | A1 | * | 10/2004 | Schwingel | B32B 15/017 428/613 |
| 2004/0243237 | A1 | * | 12/2004 | Unwin | A61F 2/44 623/17.11 |
| 2010/0183470 | A1 | * | 7/2010 | Stone | B22F 5/006 419/28 |
| 2012/0051898 | A1 | * | 3/2012 | Parolini | B22D 19/00 415/200 |
| 2012/0085811 | A1 | * | 4/2012 | Warke | B21C 33/004 228/104 |
| 2016/0101599 | A1 | * | 4/2016 | Kaiser | B32B 15/011 428/596 |

FOREIGN PATENT DOCUMENTS

| | | | | |
|---|---|---|---|---|
| CN | 104105807 | | 10/2014 | |
| CN | 104291012 | | 1/2015 | |
| EP | 0997215 | A2 * | 5/2000 | ............ B22F 7/006 |
| FR | 1347062 | A * | 12/1963 | |
| JP | 02-187282 | | 7/1990 | |
| JP | 04-143251 | | 5/1992 | |
| JP | 2015-045040 | | 3/2015 | |
| KR | 10-2010-0090302 | | 8/2010 | |
| RU | 2084549 | C1 * | 7/1997 | ............ H01J 37/077 |
| SU | 469574 | | 5/1975 | |
| WO | WO-2008095691 | A1 * | 8/2008 | ............ B22F 3/1125 |
| WO | 2017/018519 | | 2/2017 | |

OTHER PUBLICATIONS

Nippon Steel, "Titanium Standards", 2019, p. 10, https://www.nipponsteel.com/en/product/titan/pdf/index01en.pdf, retrieved from internet Jul. 27, 2020 (Year: 2019).*
ASTM International, B338 Standard Specification for Titanium and Titanium Alloys, retrieved from web on Jan. 25, 2021 (Year: 2021).*
GOST Catalog; GOST Standard 19807-91; Compositional Chart; Retrieved from https://internet-law.ru/gosts/gost/28149/ ;Aug. 20, 2021 (Year: 1992).*
Corrosion Materials; "Titanium Grade 2 Products", Retrieved from internet on Mar. 10, 2022; https://corrosionmaterials.com/alloys/titanium-orade-2/; Jun. 22, 2015 (Year: 2015).*
GOST Catalog; GOST Standard 17746-79; Compositional Chart; Retrieved from https://internet-law.ru/gosts/gost/45084/ ;Aug. 20, 2021 (Year: 1982).*
Kiyoshi Shibata et al., "Mechanism and Mathematical Modeling for Chlorine Removal in Titanium Produced by Kroll Process", Nippon Steel Technical Report, 2001, No. 375, pp. 33-37.
Zhong Yun Fan et al., "Microstructure and Mechanical Properties . . . Elemental Powder Metallurgy Method", Key Engineering Materials, vol. 127-131, Nov. 30, 1996, pp. 423-430.
Nippon Steel, Titanium Products, Mar. 31, 2019, pp. 16-17.

* cited by examiner

TITANIUM PRODUCT AND METHOD FOR PRODUCING THE SAME

TECHNICAL FIELD

The present invention relates to a titanium product and a method for producing the titanium product.

BACKGROUND ART

Owing to its characteristics, including being light weight and excellent corrosion resistance, titanium products are utilized for seawater-cooled condensers for plants, heat exchangers, reaction vessels, coolers and the like. Further, for its high specific strength, titanium products are expected to find applications in structural material to be used for transportation such as automobiles and aircraft for the purpose of improving fuel consumption by reducing the weight.

In addition, in recent years the value of a titanium product is increasing as a maintenance-free building material which makes use of the high specific strength and high corrosion resistance of the titanium product. For example, as one instance thereof, there are examples in which a titanium product is applied to roofing materials for enhancing earthquake resistance and to cover materials for preventing cladding corrosion by seawater.

Thus, although the application of titanium products is proceeding in various fields, a titanium product is an extremely expensive starting material in comparison to other steel materials and the like. Therefore, it is necessary to reduce the production cost in order to expand the adaptive uses of titanium products.

The high production cost of a titanium product is attributed to the production method. A titanium product is normally produced in the following manner. Titanium oxide as the raw material is chlorinated to form titanium tetrachloride, and thereafter is reduced using magnesium (Kroll process) or sodium (Hunter process), and is then subjected to a vacuum separation process to produce sponge-like titanium metal (titanium sponge) in a lump shape.

The titanium sponge is subjected to press-forming to form a consumable titanium electrode, and a titanium ingot is produced by vacuum arc melting that adopts the consumable titanium electrode as an electrode. In recent years, a method for producing titanium ingots is also being used in which titanium sponge is melted by means of plasma or an electron beam within a water-cooled copper hearth, and titanium ingots are successively extracted from water-cooled copper molds.

Titanium ingots produced by these methods are bloomed, forged and rolled to form a titanium slab (including a so-called "bloom" and "billet" according to the shape and the like; the same applies hereinafter). In addition, the titanium slab is subjected to hot rolling, annealing, pickling, cold rolling, and a vacuum heat treatment to thereby produce a titanium product of Class 1, Class 2, Class 3, Class 4 or the like defined in JIS H 4600 (Titanium and titanium alloys—Sheets, plates and strips).

Among these production processes, the process for producing the titanium sponge and the process for producing the titanium ingots are discontinuous batch-type processes, and therefore the production cost increases. Consequently, in order to reduce the cost of producing titanium, technology has been disclosed that produces titanium directly from titanium sponge without undergoing a melting process.

Patent Document 1 discloses a method that produces a titanium ingot (corresponds to a titanium slab) by melting the surface of a porous titanium raw material (titanium sponge) that is formed in a rectangular parallelepiped shape using an electron beam under vacuum to turn a surface layer portion into dense titanium. Subsequently, the titanium ingot is subjected to hot rolling and cold rolling to produce a titanium product. The method disclosed in Patent Document 1 can produce a dense titanium ingot that has a porous portion formed by forming a porous titanium raw material into a slab shape, and a dense coating portion that is composed of dense titanium and that covers the porous portion.

LIST OF PRIOR ART DOCUMENTS

Patent Document

Patent Document 1: JP2015-045040A

SUMMARY OF INVENTION

Technical Problem

In this connection, magnesium chloride (hereinafter, described as "$MgCl_2$") unavoidably remains inside a titanium product that is produced without completely melting titanium sponge. Considering the adverse effect on the mechanical properties of the titanium product, it is preferable that the residual amount of $MgCl_2$ is smaller. On the other hand, in order to reduce the remaining $MgCl_2$ content inside a titanium product, it is necessary to raise the purity of the titanium sponge that is the raw material, and in this case an increase in the cost that is caused by raising the purity of the titanium sponge is a concern.

Patent Document 1 describes that $MgCl_2$ can be volatilized and removed by irradiating an electron beam onto the titanium sponge. However, since the necessity arises to irradiate the electron beam until heat is transmitted into inside of the titanium sponge, the production cost is liable to increase.

Further, in Patent Document 1, since the internal $MgCl_2$ is volatilized and removed, absolutely no consideration is given to the affect that $MgCl_2$ remaining in a titanium product has upon the mechanical properties of the titanium product.

In addition, in the titanium ingot disclosed in Patent Document 1, the dense coating portion is formed by melting only the surface by means of an electron beam. However, it is difficult to evenly melt titanium sponge that is porous and whose shape is not uniform so as to have a constant thickness, and the thickness of the dense coating portion that was melted and solidified becomes uneven.

With respect to such a titanium ingot, even if hot and cold working are performed to produce a titanium product, the thickness of a surface layer portion that corresponds to the pre-working dense coating portion will not be even. Therefore, in addition to the problem of deterioration in the surface texture of the titanium, there is also the problem that the mechanical properties such as the tensile properties and bendability are not stable. Further, in a case where the thickness of the dense coating portion of the titanium slab is small, the problem also arises that when performing hot working or cold working, the surface layer portion cracks or becomes constricted and forms crease-like defects. Note that, although a titanium ingot, and not a titanium slab, is described in Patent Document 1, the titanium ingot has a rectangular shape that does not require blooming, and is thus referred to hereunder as "titanium slab".

The present invention was made to solve the problems described above, and an objective of the present invention is to provide a titanium product which is excellent in surface texture and ductility, and is also low in cost.

Solution to Problem

The present invention is as enumerated below.

(1) A titanium product including an inner layer portion and a surface layer portion, wherein:
a chemical composition of the surface layer portion consists, by mass %, of:
O: 0.40% or less,
Fe: 0.50% or less,
Cl: 0.020% or less,
N: 0.050% or less,
C: 0.080% or less,
H: 0.013% or less, and
the balance: Ti and impurities;
a chemical composition of the inner layer portion consists, by mass %, of:
O: 0.40% or less,
Fe: 0.50% or less,
Cl: more than 0.020 and not more than 0.60%,
N: 0.050% or less,
C: 0.080% or less,
H: 0.013% or less, and
the balance: Ti and impurities;
the inner layer portion has pores;
in a cross-section perpendicular to a longitudinal direction of the titanium product, an area fraction of the pores of the inner layer portion is more than 0% and not more than 30%; and
the titanium product satisfies formula (i) below:

$$Cl_I \leq 0.03 + 0.02 \times t_S / t_I \quad \text{(i)}$$

where, the meaning of each symbol in formula (i) above is as follows:
$Cl_I$: Cl content (mass %) of inner layer portion
$t_S$: thickness of surface layer portion
$t_I$: thickness of inner layer portion.

(2) A method for producing a titanium product, the titanium product being according to (1) above, including:
a step of fabricating a titanium package having a chemical composition consisting, by mass %, of,
O: 0.40% or less,
Fe: 0.50% or less,
Cl: 0.020% or less,
N: 0.050% or less,
C: 0.080% or less,
H: 0.013% or less, and
the balance: Ti and impurities;
a step of filling the titanium package with one or more types selected from titanium sponge and a briquette obtained by compressing the titanium sponge,
the titanium sponge having a chemical composition consisting, by mass %, of;
O: 0.40% or less,
Fe: 0.50% or less,
Cl: more than 0.020 and not more than 0.60%,
N: 0.050% or less,
C: 0.080% or less,
H: 0.013% or less, and
the balance: Ti and impurities;

a step of making a degree of vacuum inside the titanium package 10 Pa or less, and thereafter hermetically sealing a circumference of the titanium package so that the degree of vacuum inside the titanium package is maintained, to thereby form a titanium packing body; and
a step of performing hot working on the titanium packing body.

(3) The method for producing a titanium product according to (2) above, further including:
a step of performing cold working and annealing after the step of performing hot working.

Advantageous Effects of Invention

According to the present invention, a titanium product can be provided which is excellent in surface texture and ductility, and which is also low in cost.

DESCRIPTION OF EMBODIMENTS

When obtaining a titanium slab by melting titanium sponge in the conventional manner, chlorine inside the titanium sponge is volatilized and removed during the melting process. On the other hand, when titanium sponge or the like is used as a raw material without being melted, $MgCl_2$ that would be volatilized in a melting process remains in the titanium product. If a high-quality titanium sponge or the like is used as the raw material, the adverse effect on the mechanical properties of the titanium caused by $MgCl_2$ can be reduced because the remaining amount of $MgCl_2$ can be decreased. However, in this case the problem arises that the production cost of the titanium product as the finished product increases. Therefore, if an $MgCl_2$ content that does have an adverse effect on the mechanical properties of a titanium product as a finished product can be determined, a low-quality raw material can be selected as the raw material.

The present inventors conducted intensive studies based on the above viewpoint. Further, the present inventors conducted studies with respect to the structure of a titanium product having the target mechanical properties that is produced by hot working (and where necessary, also cold working) directly from titanium sponge without undergoing a melting process.

First, since chlorine hardly dissolves in titanium, the remaining amount of $MgCl_2$ that remains in a titanium product can be defined by the content of Cl that is a structural element thereof. Based on this fact, the present inventors examined the relation between the Cl content contained in a titanium product and the mechanical properties of the titanium product.

As a result, the present inventors found that, by providing a titanium product with a structure that has an inner layer portion and a surface layer portion that is joined thereto, and defining the respective Cl contents of the inner layer portion and the surface layer portion, and also controlling the respective thicknesses of the surface layer portion and the inner layer portion according to the Cl content of the inner layer portion, deterioration of the mechanical properties can be prevented without increasing the production cost. More specifically, the present inventors found that by increasing the thickness of the surface layer portion as the Cl content of the inner layer portion increases, a deterioration in the mechanical properties of titanium that is attributable to $MgCl_2$ that is mixed in the titanium can be prevented.

The present invention has been made based on the above findings. The respective requirements of the present invention are described in detail hereunder. Note that, in the following description, the symbol "%" in relation to chemical composition means "mass %" unless specifically stated otherwise.

1. Titanium Product 1

1-1. Overall Structure

Figure 1:
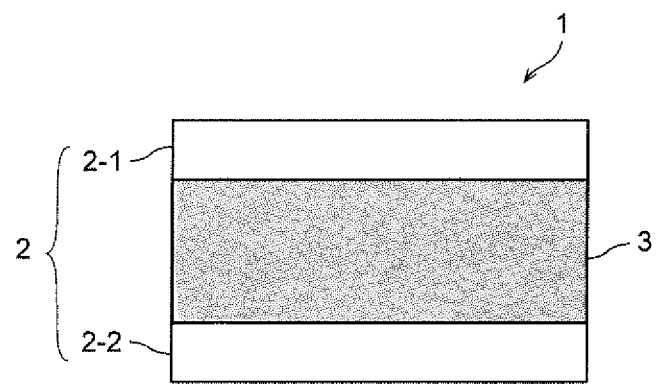
FIG. 1 is a view for describing the structure of a titanium product according to one embodiment of the present invention.
Figure 2:
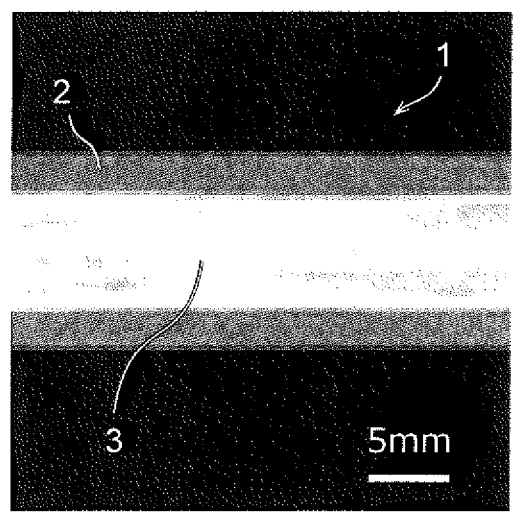
FIG. 2 is a microstructure photograph obtained by observing a cross-section of the titanium product according to one embodiment of the present invention.

FIG. 1 is a view for describing the structure of a titanium product according to one embodiment of the present invention. As illustrated in FIG. 1, a titanium product 1 includes a surface layer portion 2 and an inner layer portion 3. In the present embodiment, the surface layer portion 2 is joined to each of the two faces of the inner layer portion 3. FIG. 2 is a microstructure photograph obtained by observing a cross-section of the titanium product. It will be understood from FIG. 2 also that the surface layer portion 2 and the inner layer portion 3 can be clearly distinguished. In addition, it is discernible that variations in the thickness of the surface layer portion 2 are constant within a range of ±15%, and the titanium product is excellent in surface texture.

Figure 3:
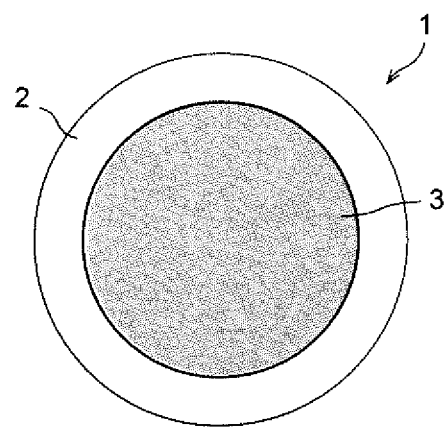
FIG. 3 is a view for describing the structure of a titanium product according to another embodiment of the present invention.

Note that, although in the structure illustrated in FIGS. 1 and 2 the titanium product 1 is a plate material, the structure of the titanium product 1 is not limited thereto, and for example the titanium product 1 may be a round bar material or a wire rod. FIG. 3 is a view for describing the structure of a titanium product according to another embodiment of the present invention. As illustrated in FIG. 3, in a case where the titanium product 1 is a round bar material or a wire rod, the structure is one in which the surface layer portion 2 is joined so as to cover the entire circumference of the cylindrical inner layer portion 3.

1-2. Surface Layer Portion 2

The chemical composition of the surface layer portion 2 is made the same as the chemical composition defined for Class 4 of JIS H 4600, with the exception of Cl. The specific chemical composition is O: 0.40% or less, Fe: 0.50% or less, Cl: 0.020% or less, N: 0.050% or less, C: 0.080% or less, and H: 0.013% or less. In particular, by limiting the Cl content in the surface layer portion 2 to 0.020% or less, it is possible to improve the ductility as the titanium product 1.

O may be 0.30% or less, 0.10% or less, 0.050% or less, 0.010% or less, or 0.0060% or less. Fe may be 0.30% or less, 0.20% or less, 0.10% or less, 0.070% or less, or 0.050% or less. Cl may be 0.018% or less, 0.015% or less, 0.012% or less, or 0.009% or less. N may be 0.040% or less, 0.030% or less, 0.010% or less, 0.005% or less, or 0.001% or less. C may be 0.040% or less, 0.020% or less, 0.010% or less, 0.007% or less, 0.005% or less, or 0.002% or less. H may be 0.010% or less, 0.005% or less, 0.003% or less, or 0.002% or less. It is not particularly necessary to set a lower limit for these elements, and the lower limit of these elements is 0%.

In the chemical composition of the surface layer portion 2, the balance is Ti and impurities. The impurity elements are mainly exemplified by Sn, Mo, V, Mn, Nb, Mg, Si, Cu, Co, Pd, Ru, Ta, Y, La, Ce and the like that get mixed in from titanium sponge or scrap that serves as the raw material of an outer layer packaging material 5 that is described later. Although the contents of these impurity elements are not defined in JIS H 4600, it is preferable to reduce the contents of these impurity elements as much as possible. However, if the total content when combined with the aforementioned O, N, C, Fe and H is 5% or less, containing these impurities does not hinder the mechanical property that is a target of the present invention. As necessary, the total content thereof may be 1% or less, 0.50% or less, 0.20% or less, or 0.10% or less. In addition, the total of the contents of the impurity elements may be 2% or less, 1% or less, 0.50% or less, 0.20% or less, or 0.10% or less.

Note that, as used herein, the term "mechanical property that is a target" means that the total elongation when a tension test is performed in a direction that is parallel to the working direction of the titanium product 1 is 20% or more.

Since the surface layer portion 2 is formed by rolling a titanium plate or the like, there are fundamentally no pores in the surface layer portion 2. That is, the area fraction of pores (hereunder, also referred to as simply "porosity"; a definition and a method of measuring the porosity and the like are described later) of the surface layer portion 2 is 0%. The porosity of the surface layer portion 2 may be less than 0.10%, less than 0.050%, or less than 0.010%.

1-3. Inner Layer Portion 3

The chemical composition of the inner layer portion 3 is the same as the chemical composition defined for Class 4 of JIS H 4600, with the exception of Cl. The specific chemical composition is O: 0.40% or less, Fe: 0.50% or less, Cl: more than 0.020% and not more than 0.60%, N: 0.050% or less, C: 0.080% or less and H: 0.013% or less.

As described above, in the present invention, in order to obtain the titanium product 1 that is low in cost, it is preferable to use a raw material having titanium of low purity for the inner layer portion 3. In a raw material having high-purity titanium, the Cl content decreases during the production process. In other words, a raw material in which the Cl content is small has a high titanium purity and is expensive. Therefore, making the Cl content of the inner layer portion 3 0.020% or less is not preferable because the necessity arises to use a high-purity raw material and the production cost rises. On the other hand, if the Cl content of the inner layer portion 3 is more than 0.60%, even if the Cl content of the surface layer portion 2 is reduced, the tensile properties and bendability of the titanium product 1 deteriorate significantly.

O may be 0.15% or less, 0.10% or less, 0.050% or less, 0.010% or less, or 0.006% or less. Fe may be 0.30% or less, 0.20% or less, 0.10% or less, 0.070% or less, or 0.050% or less. The lower limit of Cl may be 0.025%, 0.030%, 0.040% or 0.050%, and the upper limit of Cl may be 0.15%, 0.35% or 0.55%. N may be 0.040% or less, 0.030% or less, 0.010% or less, 0.005% or less, or 0.001% or less. C may be 0.040% or less, 0.020% or less, 0.010% or less, 0.007% or less, 0.005% or less, or 0.002% or less. H may be 0.010% or less, 0.005% or less, 0.003% or less, or 0.002% or less. It is not particularly necessary to set a lower limit for these elements, and the lower limit of these elements is 0%.

In the chemical composition of the inner layer portion 3, the balance is ii and impurities. The impurity elements are mainly exemplified by Sn, Mo, V, Mn, Nb, Mg, Si, Cu, Co, Pd, Ru, Ta, Y, La, Ce and the like that get mixed in from titanium sponge. In particular, Mg gets mixed in as $MgCl_2$. Although the contents of these impurity elements are not defined in JIS H 4600, it is preferable to decrease the contents of these impurity elements as much as possible. However, if the total content when combined with the aforementioned O, N, C, Fe and H is 5% or less, containing these impurities does not hinder a mechanical property that is the target of the present invention. As necessary, the total content thereof may be 1% or less, 0.5% or less, 0.2% or less, or 0.1% or less. In addition, the total of the contents of the impurity elements may be 2% or less, 1% or less, 0.50% or less, 0.20% or less, or 0.10% or less.

In the present invention, the chemical composition of the surface layer portion 2 and of the inner layer portion 3 is measured by the following method.

A component analysis of the surface layer portion 2 and the inner layer portion 3 is performed by a known method (for example, JIS H 1612 (1993), JIS H 1614 (1995), JIS H 1615 (1997), JIS H 1617 (1995), JIS H 1619 (2012), JIS H 1620 (1995)). At such time, measurement is performed after cutting out the surface layer portion 2 and the inner layer portion 3 from the titanium product 1. It is efficient to analyze the surface layer portion 2 based on machined chips or the like that were obtained by a cutting process or the like, and to analyze the inner layer portion 3 based on material that remains after removing the outer layer. In a case where the thickness of the surface layer portion 1 and the inner layer portion 3 is thin and an adequate amount of machined chips are not obtained, a component analysis may be performed for the titanium product 1 overall, and the components of the outer layer may be calculated (calculated back) based on the analysis value for the titanium product 1 overall and the analysis value for either one of the surface layer portion 1 and the inner layer portion 3 and the respective plate thicknesses thereof. The component analysis of the surface layer portion 1 or the inner layer portion 3 may also be performed by EPMA or the like.

Figure 4:
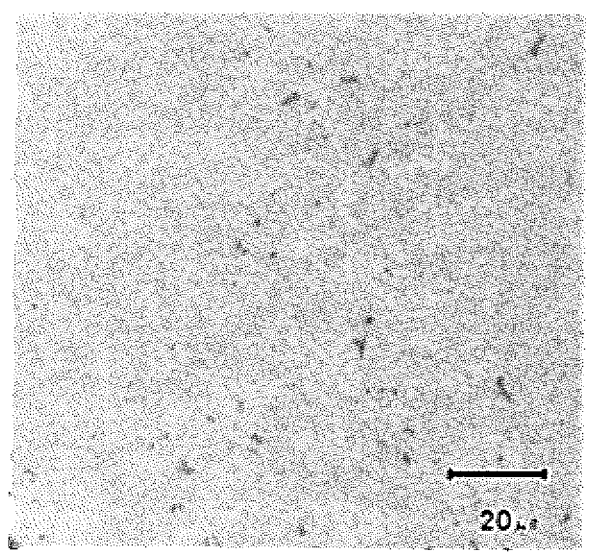
FIG. 4 is a microstructure photograph obtained by observing, in an inner layer portion, a cross-section perpendicular to a longitudinal direction of a titanium product.

FIG. 4 is a microstructure photograph obtained by observing a cross-section perpendicular to the longitudinal direction of the titanium product 1 in the inner layer portion 3. As will be understood from FIG. 4, the inner layer portion 3 has pores. The pores are unavoidably included during the course of production. To completely eliminate the pores, it is necessary to perform working with a large rolling reduction, and in addition to limiting the shape and dimensions of the titanium product 1, such working is also a cause of a steep increase in the production cost. On the other hand, as a consequence of having pores, it can be expected that the weight of the titanium product 1 will be reduced because the density of the inner layer portion 3 is lowered.

If the proportion of pores in the inner layer portion 3 becomes excessive, the mechanical properties of the titanium product 1 decline. To avoid a decline in the mechanical properties, an area fraction of pores in the inner layer portion 3 in a cross-section perpendicular to the longitudinal direction of the titanium product 1 is made more than 0% and not more than 30%. As described above, in the description of the present application, the area fraction of pores observed in a cross-section perpendicular to the longitudinal direction of the titanium product 1 is also referred to as "porosity". The aforementioned porosity may be 10% or less, 5% or less, 2% or less, 1% or less, or 0.5% or less.

The porosity of the inner layer portion 3 can be selected according to the intended use, and may be made low in a case where the mechanical properties as the titanium product 1 are important, and may be made high in a case where priority is given to weight reduction. In particular, in a case where importance is placed on the mechanical properties of the titanium product 1, the porosity is more preferably 5% or less, further preferably is 3% or less, and particularly preferably is 1% or less. A lower limit of the porosity is more than 0%, and as necessary may be 0.01%, 0.05% or 0.1%.

Here, a porosity p means the percentage of the area of pores that are present in the inner layer portion with respect to the area of the inner layer portion, and is defined as follows:

$p(\%)$=area of pores present in inner layer portion/ area of inner layer portion×100

The porosity p is determined by the following procedure. First, a sample for observation is cut out from the titanium product 1. In a case where the titanium product 1 is thick-walled, a sample for observation is cut out from the center part of the plate thickness of the inner layer portion 3. The sample for observation that was cut out is embedded in a resin such that a cross-section perpendicular to the longitudinal direction of the titanium product 1 becomes the surface to be observed, and thereafter is buffed and mirror-finished using a diamond or alumina suspension. A photograph of the mirror-finished surface to be observed that is from the center part of the plate thickness of the titanium product 1 is then taken with an optical microscope.

The area of pores included in the obtained optical micrograph is measured, and the porosity is determined by dividing the area of pores by the area of the overall photographing visual field. At such time, imaging by the optical microscope is performed so that the observation area is 0.3 $mm^2$ or more in total (20 visual fields or more in optical micrographs at 500× magnification), and the average value thereof is adopted. Although there is no problem with using a normal optical microscope as a microscope that is used in the observation, it is preferable to use a differential interference contrast microscope that is capable of polarized light observation because the differential interference contrast microscope is capable of performing observation more clearly.

1-4. Thickness of Surface Layer Portion 2 and Inner Layer Portion 3

In the present invention, by increasing the proportion of the thickness of the surface layer portion 2 relative to the thickness of the inner layer portion 3 as the Cl content of the inner layer portion 3 increases, a deterioration in the mechanical properties of the titanium product 1 overall that is attributable to $MgCl_2$ is prevented.

Specifically, the thicknesses of the surface layer portion 2 and the inner layer portion 3 as well as the Cl content of the inner layer portion 3 are controlled so as to satisfy formula (i) below.

$$Cl_I \leq 0.03 + 0.02 \times t_S/t_I \qquad (i)$$

Where, the meaning of each symbol in formula (i) above is as follows:
$Cl_I$: Cl content (mass %) of inner layer portion
$t_S$: thickness of surface layer portion
$t_I$: thickness of inner layer portion.

Note that, in the present embodiment, the term "thickness of the surface layer portion 2" refers to the thickness of the portion denoted by reference numeral 2-1 or 2-2 in FIG. 1. In a case where the thicknesses of the two surface layer portions 2 are different to each other, the thickness of the surface layer portion 2 is taken as the thinner thickness, that is, the smaller thickness among the two thicknesses. In a case where the titanium product 1 is a round bar material or a wire rod, the term "thickness of the surface layer portion 2" refers to the thickness of the portion denoted by reference numeral 2 in FIG. 3.

The microstructures and grain diameters of the surface layer portion 2 and the inner layer portion 3 are different to each other. Therefore, as illustrated in FIG. 2, by polishing and etching a cross-section perpendicular to the rolling direction of the titanium product, the boundaries between the surface layer portions 2 and the inner layer portion 3 can be clearly distinguished. Further, the thicknesses of the surface layer portion 2 and the inner layer portion 3 of the titanium product 1 are each measured based on a microstructure photograph obtained by observing a cross-section of the titanium product. For example, the thickness at arbitrary positions (for example, five places) is measured for each of the surface layer portion 2 and the inner layer portion 3, and the respective averages of the measured values are taken as being the respective thicknesses of the surface layer portion 2 and the inner layer portion 3. Note that, in a case where the titanium product 1 is a round bar material or a wire rod, the diameter of the inner layer portion 3 illustrated in FIG. 3 is taken as the thickness of the inner layer portion 3.

Further, $MgCl_2$ is distributed according to the amount of Cl that is contained, and the surface layer portion 2 and the inner layer portion 3 may be distinguished based on the existence or non-existence of $MgCl_2$. In the present invention, the Cl content of the inner layer portion is made more than 0.020% and not more than 0.60%, and the Cl content of the surface layer portion is made 0.020% or less, and thus the Cl content of the inner layer portion is higher than the Cl content of the surface layer portion. Therefore, the inner layer portion and the surface layer portion can also be distinguished based on a difference between the Cl concentrations. As specific means, the difference between the Cl concentrations of the inner layer portion and the surface layer portion will be revealed by observing the element distribution state of Cl that is determined by EPMA measurement after subjecting a cross-section as shown in FIG. 4 to mirror polishing.

The thickness of the surface layer portion 2 is preferably 0.01 to 35 mm while satisfying the aforementioned formula (i). If the thickness of the surface layer portion 2 is less than 0.01 mm, there is a possibility that the surface layer portion 2 will be too thin and will rupture when producing the titanium product 1, and the inner layer portion will be exposed at the surface. The lower limit of the thickness of the surface layer portion 2 may be 0.05 mm, 0.10 mm, 0.15 mm or 0.20 mm. The upper limit of the thickness of the surface layer portion 2 is determined by the thickness of the titanium product 1 and the lower limit of the thickness of the inner layer portion. The upper limit of the thickness of the surface layer portion 2 may be 0.30 mm, 0.50 mm, 1.0 mm, 3.0 mm, 10 mm or 20 mm.

The thickness of the inner layer portion 3 is preferably 0.01 to 90 mm while satisfying the aforementioned formula (i). If the thickness of the inner layer portion 3 is less than 0.01 mm, the amount of titanium sponge with a high Cl content that can be effectively used will decrease, and it will be difficult to obtain the effect of the present invention. The lower limit of the thickness of the inner layer portion 3 may be 0.05 mm, 0.10 mm, 0.20 mm, 0.50 mm or 0.70 mm. The upper limit of the thickness of the inner layer portion 3 is determined by the thickness of the titanium product 1 and the lower limit of the thickness of the surface layer portion. The upper limit of the thickness of the inner layer portion 3 may be 0.90 mm, 1.2 mm, 1.5 mm, 2.0 mm, 5.0 mm, 10 mm, 20 mm, or 50 mm.

The thickness of the titanium product 1 is 0.03 mm or more while satisfying the aforementioned formula (i). The thickness of the titanium product 1 may be 0.10 mm or more, 0.30 mm or more, or 0.50 mm or more. Further, as long as the thickness of the titanium product 1 satisfies the aforementioned formula (i), the thickness may be 20 mm or less, 50 mm or less, or 100 mm or less. However, when taking the cost into consideration, the thickness of the titanium product 1 is preferably 15 mm or less while satisfying the aforementioned formula (i). The thickness of the titanium product 1 may be 10 mm or less, 5.0 mm or less, 4.0 mm or less, 2.0 mm or less, 1.5 mm or less, or 1.2 mm or less.

2. Titanium Packing Body 4

2-1. Overall Structure

Figure 5:
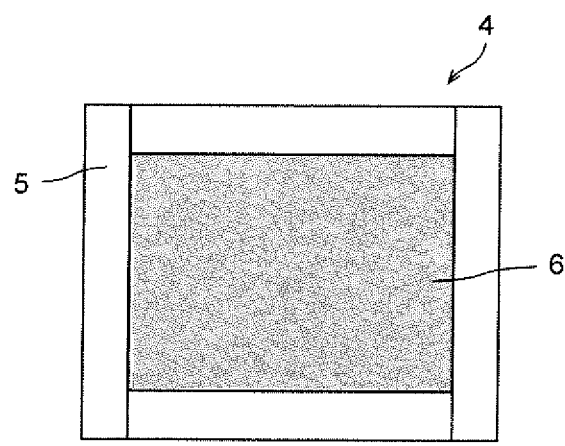
FIG. 5 is a view for describing the structure of a titanium packing body that is a starting material of a titanium product according to one embodiment of the present invention.

FIG. 5 is a view for describing the structure of a titanium packing body 4 that is a starting material of the titanium product 1 according to one embodiment of the present invention. As illustrated in FIG. 5, the titanium packing body 4 has a structure in which the inside of a titanium package constituted by the outer layer packaging materials 5 is filled with titanium lumps 6 that are composed of titanium sponge or a briquette obtained by compressing titanium sponge.

Figure 6:
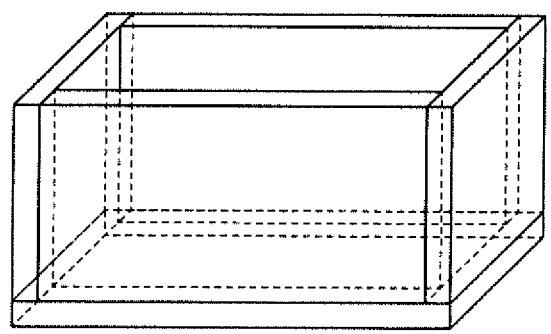
FIG. 6 is a view for describing the structure of the titanium package.

FIG. 6 is a view for describing the structure of the titanium package. In the example illustrated in FIG. 6, five plate-like outer layer packaging materials 5 are assembled into box shape in a state in which only the top face is open. Note that, the top face can be sealed by another plate-like outer layer packaging material 5 that is not illustrated in the drawing. In the following description, the object that is obtained when the outer layer packaging materials 5 are in an assembled state as illustrated in FIG. 6 is referred to as a "titanium package". Further, the titanium lumps 6 are in a state in which the circumference thereof is completely covered by the outer layer packaging materials 5 constituting a titanium package. Although the titanium package is a box shape in the aforementioned example, the shape of the titanium package is not limited, and the titanium package may be a tube shape or may be a shape obtained by combining plate materials and a pipe material.

As described later, the titanium product 1 is obtained by performing hot working or the like (for example, hot rolling, cold rolling or the like) on the titanium packing body 4. That is, the outer layer packaging materials 5 and the titanium lumps 6 of the titanium packing body 4 correspond to the surface layer portion 2 and the inner layer portion 3 of the titanium product 1 after hot working, respectively. Note that, in the present invention, titanium sponge and a briquette packed in the titanium package are collectively referred to as "titanium lump 6".

To prevent the titanium lumps 6 from oxidizing or nitriding during high-temperature heating and holding during hot working, the degree of vacuum (absolute pressure) inside the titanium packing body 4 is made 10 Pa or less. Preferably, the degree of vacuum inside the titanium packing body 4 is 1 Pa or less. A lower limit of the internal pressure is not particularly defined. However, making the degree of vacuum extremely small causes an increase in the production cost due to improvement of the airtightness of equipment or enhancement of a vacuum pumping device or the like. Therefore, the degree of vacuum is preferably made $1\times10^{-3}$ Pa or more. Note that, the degree of vacuum inside the outer layer packaging materials 5 indicates the degree of vacuum in a region (also referred to as "pore") excluding the titanium lumps 6 among the region surrounded by the outer layer packaging materials 5.

In the configuration shown in FIG. 5, since the titanium packing body 4 is adopted as the starting material of the titanium product 1 that is a plate material, a cross-section perpendicular to a direction (rolling direction) in which hot working is to be performed is a square shape. However, the present invention is not limited thereto, and in a case of adopting the titanium packing body 4 as the starting material of the titanium product 1 that is a round bar material or a wire rod, a cross-section perpendicular to the rolling direction of the titanium packing body 4 may be a circular shape or a polygonal shape.

2-2. Outer Layer Packaging Material 5

The chemical composition of the outer layer packaging material 5 is made the same as the chemical composition of the surface layer portion 2 of the titanium product 1 described in the above section 1-2. Titanium of Class 1, Class 2, Class 3 or Class 4 of JIS H 4600 can be used for the outer layer packaging material 5.

The shape of the titanium product used as the outer layer packaging material 5 depends on the shape of the titanium packing body 4. Therefore, the outer layer packaging material 5 is not a particularly fixed shape, and, for example, is a plate material or a pipe material. However, to ensure the hot workability and cold workability of the titanium packing body 4 and to also provide the titanium product 1 with excellent surface texture and ductility as well as bendability, it is necessary to adjust the thickness of the plate material or the wall thickness of the pipe material to be utilized as the outer layer packaging material 5. Hereunder, the thickness of the plate material or the wall thickness of the pipe material to be utilized as the outer layer packaging material 5 is referred to simply as "thickness of the outer layer packaging material 5".

If the outer layer packaging material 5 has a thin thickness of less than 0.5 mm, the outer layer packaging material 5 ruptures in the course of hot working accompanying plastic deformation, and a vacuum is lost, which causes oxidation of the titanium lumps 6 inside. Further, the ruggedness of the titanium sponge packed inside the titanium packing body 4 is transferred to the surface of the outer layer packaging material 5, and a large surface ruggedness occurs on the surface of the titanium packing body 4 during the hot working. These consequently have an adverse effect on the mechanical properties of the produced titanium product 1 such as surface texture and ductility.

Further, if the outer layer packaging material 5 is excessively thin, the outer layer packaging material 5 cannot support the weight of the titanium sponge packed inside. As a result, the rigidity of the titanium packing body 4 at room temperature, when being held while heated, or during working is insufficient and deformation occurs. Therefore, the thickness of the outer layer packaging material 5 is made 0.5 mm or more. The thickness of the outer layer packaging material 5 is preferably 1.0 mm or more, and more preferably is 2.0 mm or more. Further, the packaging material is assembled by welding, and is formed into a titanium package or a titanium packing body. The thickness thereof is made 70 mm or less to ensure the strength of weld zones. The thickness of the outer layer packaging material 5 may be 30 mm or less, 10 mm or less, or 5.0 mm or less.

Note that, if the thickness of the outer layer packaging material 5 is excessive, although a problem does not arise in terms of production, it is difficult to obtain a cost reduction effect. Therefore, the thickness of the outer layer packaging material 5 is preferably made 40% or less, or 20% or less of the overall thickness of the titanium packing body 4.

2-3. Titanium Lump 6

The chemical composition of the titanium lump 6 is made the same as the chemical composition of the inner layer portion 3 of the titanium product 1 described in the above section 1-3. A titanium lump of a composition range defined for Class 1, Class 2, Class 3 or Class 4 of JIS H 4600, excluding Cl, can be used as the titanium lump 6. The specific chemical composition thereof is O: 0.40% or less, Fe: 0.50% or less, Cl: more than 0.020% and not more than 0.60%, N: 0.050% or less, C: 0.080% or less, and H: 0.013% or less.

O may be 0.15% or less, 0.10% or less, 0.050% or less, 0.010% or less, or 0.006% or less. Fe may be 0.30% or less, 0.20% or less, 0.10% or less, 0.070% or less, or 0.050% or less. The lower limit of Cl may be 0.025%, 0.030%, 0.040%, or 0.050%, and the upper limit of Cl may be 0.15%, 0.35%, or 0.55%. N may be 0.040% or less, 0.030% or less, 0.010% or less, 0.005% or less, or 0.001% or less. C may be 0.040% or less, 0.020% or less, 0.010% or less, 0.007% or less, 0.005% or less, or 0.002% or less. H may be 0.010% or less, 0.005% or less, 0.003% or less, or 0.002% or less.

It is not particularly necessary to set a lower limit for these elements, and the lower limit of these elements is 0%. By controlling the chemical composition to within the aforementioned ranges, it is possible to adjust the chemical composition of the inner layer portion 3 after hot working to within the aforementioned ranges. Further, elements exemplified by Sn, Mo, V, Mn, Nb, Mg, Si, Cu, Co, Pd, Ru, Ta, Y, La, and Ce may be contained as impurities in the titanium lump 6.

As described above, in the present invention, in order to produce the low-cost titanium product 1, the titanium lump 6 of low purity that contains 0.020% or more of Cl is used as the raw material. On the other hand, if the Cl content of the titanium lump 6 is more than 0.60%, the hot workability and cold workability of the titanium packing body 4 decrease, and the surface texture and mechanical properties of the titanium product 1 that is produced deteriorate.

Note that, one or more types selected from a. titanium sponge, and b. a briquette obtained by compressing titanium sponge can be used as the titanium lump 6. The titanium sponge is normal titanium sponge produced by a conventional smelting process such as the Kroll process in which magnesium is used for reduction, and for example, titanium sponge having a chemical composition corresponding to Class 1M, Class 2M, Class 3M or Class 4M of JIS H 2151 can be used.

The titanium sponge is generally a flake-like shape, and although the size thereof differs depending on the production process, the average grain diameter is about several tens of millimeters. In the present invention, the average grain diameter of the titanium sponge is preferably 30 mm or less. This is since, if the average grain diameter of the titanium sponge is greater than 30 mm, in some cases a problem arises with respect to handling during transportation or when producing the titanium packing body 4. The grain size of the titanium sponge is preferably 30 mm or less.

On the other hand, no problem arises with respect to the properties if the average grain diameter of the titanium sponge is small. If the average grain diameter is too small, however, there is a concern that powder dust generated during filling of the titanium package formed by the outer layer packaging materials 5 will become a problem and will hinder the work. Therefore, the average grain diameter of the titanium sponge is preferably 1 mm or more.

Titanium sponge has no regular shape, and hence using a briquette obtained by compressing titanium sponge as a titanium lump is preferable since a briquette facilitates handling. A briquette is produced by inserting titanium sponge serving as the raw material into a die that is prepared in advance based on constraints relating to the slab dimensions during rolling (that is, dimensions of the titanium packing body 4) and the like, and then forming the briquette by compressing the titanium sponge with a predetermined force. At such time, although titanium scrap and the like may be mixed in with the titanium sponge, it is preferable to mix the titanium scrap and the like with the titanium sponge well beforehand so that there are no component fluctuations in the titanium lump.

2-4. Method for Determining Ratio X Between Thickness of Surface Layer Portion 2 and Thickness of Inner Layer Portion 3

The adjustment of the dimensions of the titanium packing body 4 is important in order for the titanium product 1 that is produced by subjecting the titanium packing body 4 to hot working to satisfy the aforementioned formula (i). For this purpose, it is preferable to first determine a target value of a ratio X (=ts/ti) between a thickness ts of the surface layer portion of the titanium product 1 and a thickness ti of the inner layer portion of the titanium product 1, based on formula (i). One example thereof is described next.

The range that X should satisfy can be calculated from the following formula (ii).

$$X \geq (Cl_f - 0.03)/0.02 \quad (ii)$$

Where, in a case where X<0, X is taken as being equal to 0.

When fabricating the packing body, the Cl amount of the titanium sponge serving as the raw material is measured. Since the Cl amount of the titanium lump is the same as the Cl amount of the inner layer portion of the titanium product 1, a lower limit value of the thickness ratio X of the titanium product 1 can be determined based on the measured Cl amount of the titanium lump. In addition to the lower limit value, the X value as the target is determined by also taking into account the Cl amount measurement accuracy, a margin of the thickness of the surface layer portion in consideration of surface defects or the like of the titanium product 1, and variations during production and the like.

2-5. Method for Determining Dimensions of Titanium Packing Body 4

An example of a method for determining the dimensions of the titanium packing body 4 based on the X value that is the target is described hereunder. First, when the thickness of the titanium product 1 is represented by t, the thickness of the surface layer portion of the titanium product 1 is represented by ts, and the thickness of the inner layer portion of the titanium product 1 is represented by ti, t is given by the following formula:

$$t = 2ts + ti \quad (1)$$

Based on the definition of the thickness ratio X between the surface layer portion and the inner layer portion of the titanium product 1, the thickness ratio X is given by the following formula:

$$X = ts/ti \quad (2)$$

Based on formulas (1) and (2), the thickness ts of the surface layer portion and the thickness ti of the inner layer portion of the titanium product 1 are given by the following formulas, respectively.

$$ts = X \cdot t/(2X+1) \quad (3)$$

$$ti = t/(2X+1) \quad (4)$$

When the thickness of a titanium hot-rolled product after hot rolling is taken as "t2", and pickling is performed to remove an amount corresponding to a thickness te of an oxidized layer of the outer layer per side, a thickness t3 of the hot-rolled product after pickling is given by the following formula:

$$t3 = t2 - 2te \quad (5)$$

Based on past measurement results, the porosity of a hot-rolled product after pickling and a cold-rolled product are approximately the same, and hence the thickness ratio between the surface layer portion and the inner layer portion of the hot-rolled product after pickling is equal to the thickness ratio X of the cold-rolled product. Therefore, when the thickness of the entire hot-rolled product after pickling is taken as t3, a thickness ts3 of the surface layer portion and a thickness ti3 of the inner layer portion of the hot-rolled product after pickling are given by the following formulas.

$$ts3 = X \cdot t3/(2X+1) \quad (6)$$

$$ti3 = t3/(2X+1) \quad (7)$$

Based on the above formula (6) and formula (7), a thickness ts2 of the surface layer portion and a thickness ti2 of the inner layer portion of the hot-rolled product before pickling are as follows:

$$ts2 = ts3 + te \quad (8)$$
$$= X \cdot t3/(2X+1) + te$$

$$ti2 = ti3 \quad (9)$$
$$= t3/(2X+1)$$

Based on formula (6) and formula (7), a ratio Z between the thickness of the surface layer portion and the thickness of the inner layer portion of the hot-rolled product before pickling is as follows:

$$Z = ts2/ti2 \quad (10)$$
$$= \{X \cdot t3/(2X+1) + te\}/\{t3/(2X+1)\}$$
$$= X + te(2X+1)/t3$$

Here, when a ratio te/t3 between the removed thickness (te) of the outer layer that was removed by pickling of the hot-rolled product and the thickness (t3) of the entire hot-rolled product after pickling is taken as "α", a ratio Z between the thickness of the surface layer portion and the thickness of the inner layer portion of the hot-rolled product before pickling is represented by the following formula:

$$Z = X + \alpha(2X+1) \quad (11)$$

The porosity of the inner layer of a hot-rolled product is less than 1% in many cases, and this is extremely low. Therefore, industrially and practically, the porosity can be ignored in many cases. In this case, since a ratio V (=Ts/D) between a thickness Ts of the packaging material of the titanium packing body 4 and an actual thickness D of the titanium lump 6 excluding pores is substantially the same as a ratio Z between the outer layer thickness and inner layer thickness of the hot-rolled product before pickling, the following formula is obtained:

$$V=Z$$

$$Ts/D=X+\alpha(2X+1) \quad (12)$$

Based on the above formula (10), the thickness of the surface layer portion of the titanium packing body, that is, the thickness Ts of the packaging material, can be calculated by the following formula:

$$Ts=\{X+\alpha(2X+1)\}D \quad (13)$$

Since it is known that $\alpha$ is approximately 0.01 based on past measurement results, industrially or practically, Ts can be calculated by the following formula.

$$Ts=\{X+0.01(2X+1)\}D \quad (14)$$

When fabricating the titanium packing body 4, if the actual thickness D of the titanium lump 6 excluding pores is determined in advance, the thickness Ts of the surface layer portion (thickness of the outer layer packaging material 5) of the titanium packing body 4 can be calculated based on the X value that is the target using the above formula (13) or formula (14).

Practically, the term "0.01 (2X+1)" in formula (14) is considered as zero, and Ts=X·D is assumed, and the actual thickness D of the titanium lump 6 excluding pores is provisionally determined based on the target X value and constraints such as the slab dimensions at the time of rolling (that is, dimensions of the titanium packing body 4).

The titanium lump 6 to be used in the packing body is prepared based on the aforementioned provisional determination. The final D value can be determined by the following formula based on the result of measuring a weight W of the titanium and a breadth B and a length L of the titanium packing body 4, and a density $\rho$ (=4.51 g/cm$^2$) of titanium.

$$D=W/BL\rho \quad (15)$$

Next, the thickness of the surface layer portion (thickness of the outer layer packaging material 5) Ts of the titanium packing body 4 is determined based on the obtained D value and the X value that is the target.

Note that, at such time, in a case where the Cl amount of the titanium lump 6 had been predicted based on the measurement result obtained for the Cl amount of the titanium sponge serving as the raw material, it is preferable that the chlorine amount of the fabricated titanium lumps 6 is measured and it is confirmed that the X value that is the target satisfies formula (ii). As necessary, the thickness of the surface layer portion (thickness of outer layer packaging material 5) Ts of the titanium packing body 4 is changed so as to satisfy formula (ii).

The dimensions of the packaging material in the case of producing a titanium product having a plate thickness t=1 mm, and for which X=ts/ti=0.3/0.4-0.75 are calculated.

A titanium lump was prepared, when D of the titanium lump was measured based on formula (15), and the result showed that D=17.16 mm. At the same time, Ti was also measured, and the measurement result was 48.4 mm. For reference, when the porosity P was calculated based on formula (16), the result was 1−17.16/48.4=0.65, that is, 65%.

$$D=Ti(1-P) \quad (16)$$

Based on formula (14), when the thickness Ts of the titanium packaging material is calculated, the result is:

$$Ts=(0.75+0.01(1+2\times0.75))\times17.16=13.3 \text{ mm}$$

That is, Ts=13.3 mm. Thus the packing body is one in which Ti=48.4 mm and which has a thickness T=13.3×2+48.4=75 mm.

3. Production Method

One example of a method for producing the titanium packing body 4 and the titanium product 1 according to one embodiment of the present invention will now be described. Note that, although an example of a method for producing a plate-like titanium product 1 is used in the following description, the present invention is not limited thereto.

3-1. Method for Producing Titanium Packing Body 4

First, portions corresponding to the bottom face and side faces of a titanium package are assembled into a box shape using five titanium plates (outer layer packaging materials) as illustrated in FIG. 6, to make a titanium package in a state in which only the top face is open. Next, the inside of the titanium package is filled with titanium sponge and/or a briquette which is obtained in advance by compressing and forming titanium sponge into a briquette shape. Thereafter, a titanium plate (outer layer packaging material) corresponding to the top face of the titanium package is covered thereon to thereby temporarily assemble a titanium package. Note that although in the above example the titanium package is a box shape, the shape of the titanium package is not limited, and may also be a tube shape or the like.

Next, the temporarily assembled titanium package is housed inside a vacuum chamber, and after reducing the degree of vacuum inside the chamber to 10 Pa or less, the seam portions are welded to form the titanium packing body 4. Further, ordinary titanium sponge produced by a conventional smelting process such as the Kroll process is used as the titanium sponge. However, it is necessary to adjust the Cl content in the titanium sponge so as to fall within the range defined above.

Titanium sponge produced by the Kroll process is produced by reducing titanium tetrachloride with Mg. $MgCl_2$ that is formed by such reduction of titanium tetrachloride is removed by a vacuum separation process that is the next process. However, in a case of processing a starting material that includes large lump-like titanium sponge, $MgCl_2$ is not completely removed, and a part thereof remains as an unavoidable impurity in the titanium sponge after crushing. In a case where the Cl content of the titanium sponge is more than the range defined above, for example, a vacuum re-separation process that is described below can be performed.

The vacuum re-separation process is a heat treatment under a vacuum atmosphere in which the titanium sponge is held at 900 to 1200° C. in a vacuum environment with a degree of vacuum of 1.3 Pa or less (more preferably, $1.3\times10^{-2}$ Pa or less). The heat treatment time period can be adjusted according to a desired Cl content or the Cl content of the titanium sponge that is the raw material. For example, in a case of obtaining titanium sponge having a Cl content of 0.05% or less, heating in a vacuum of $1.3\times10^{-2}$ Pa or less for 40 hours or more is preferable.

A method for welding the seam portions of the titanium package is not particularly limited. For example, arc welding such as tungsten inert gas welding and metal inert gas welding, electron beam welding, laser welding or the like may be used. However, in order to prevent the surfaces of the titanium lumps 6 and the outer layer packaging materials

5 from being oxidized or nitrided, welding is performed in a welding atmosphere that is a vacuum atmosphere or an inert gas atmosphere.

3-2. Method for Producing Titanium Product 1

A plate-like titanium product 1 is obtained by subjecting the titanium packing body 4 described above to hot rolling. Note that while hot rolling is performed in the case of obtaining a plate-like titanium product 1, when it is desired to obtain a titanium product 1 in the shape of a round bar or a wire rod, it suffices to perform hot extrusion.

After hot rolling, as required, an oxidized layer on the surface of the titanium product 1 may be removed by pickling or the like, and thereafter the titanium product 1 may be subjected to cold rolling and worked to be made thinner.

A heating temperature similar to the temperature in a case of performing hot working on a conventional titanium slab or billet fabricated by casting may be employed as the heating temperature at the time of the hot working. Although differing depending on the size of the titanium packing body 4 or the working ratio, the aforementioned heating temperature is preferably made from 600 to 1200° C.

If the aforementioned heating temperature is too low, the high temperature strength of the titanium packing body 4 becomes too high and leads to a crack during hot working. In addition, joining of the titanium lumps 6 and the outer layer packaging materials 5 will be insufficient. On the other hand, if the aforementioned heating temperature is too high, the microstructure of the obtained titanium product 1 becomes coarse, and sufficient mechanical properties are not obtained. In addition, the thickness of the outer layer packaging materials 5 is reduced by oxidation. Further, the hot working ratio is preferably made 50% or more in order to join titanium sponges together and reduce pores to thereby secure sufficient mechanical properties.

On the other hand, since an increase in pores helps to reduce weight, it is also possible to cause the titanium product 1 to contain pores within a range allowed by the mechanical properties such as strength and ductility. The hot working ratio at such time can be selected in consideration of the desired mechanical properties. At such time, the hot working ratio is preferably 30% or more and not more than 50%.

When performing cold working as necessary following the hot working, an appropriate cold working ratio can be selected according to the shape of the end product. At such time, preferably the cold working ratio is 30% or more and 95% or less. The cold working ratio may be 96% or 98% or less.

Annealing may also be performed after the hot working and cold working. The annealing is preferably performed in vacuum or an inert gas atmosphere at a temperature of 500 to 850° C., and the annealing time period can be selected according to the required mechanical properties.

Note that, a working ratio when performing hot working or cold working is a ratio (percentage) obtained by dividing a difference between the cross-sectional area before the working and after the working by the cross-sectional area before the working, and when the cross-sectional area before the working is represented by $A_B$ and the cross-sectional area after the working is represented by $A_A$, the working ratio is defined as shown hereunder. Note that, the cross-sectional area in this case is the cross-sectional area of a cross-section perpendicular to the working (rolling) direction.

Working ratio (%)=$(A_B-A_A)/A_B\times 100$

Hereunder, the present invention is more specifically described by way of Examples, although the present invention is not limited to these Examples.

Example 1

[Test Material Fabricating Process]

A titanium package was filled with titanium sponges having different Cl contents (Cl: 0.021 to 0.502%, average grain diameter: 0.25 to 19 mm) produced by the Kroll process. In this case, a titanium package of a rectangular parallelepiped shape having a thickness of 75 mm, a width of 100 mm, and a length of 120 mm was fabricated using titanium plates (JIS Class 1) having a thickness from 0.6 to 36 mm.

The test material fabricating process will now be described in detail. When fabricating the titanium packing body, first, five titanium plates (outer layer packaging materials) were assembled into a box shape having an opening at the top face, which was then filled with titanium sponges and the opening was covered using one more titanium plate (outer layer packaging material) to thereby temporarily assemble these components as a titanium package.

The temporarily assembled titanium package was placed inside a vacuum chamber, and the degree of vacuum inside the vacuum chamber was reduced to $8.2\times 10^{-3}$ to $1.1\times 10^{-1}$ Pa, and thereafter seams of the entire circumference of the titanium package were welded and sealed by an electron beam to form a titanium packing body.

Next, the titanium packing body was heated in an air atmosphere to 850° C. and thereafter subjected to hot rolling to be formed into a hot-rolled plate having a thickness of 5 mm. Thereafter, both surfaces of the hot-rolled plate were subjected to a pickling treatment (descaling treatment) in which about 50 μm was removed per side (100 μm for both surfaces) using shotblast and nitric-hydrofluoric acid.

In addition, the hot-rolled plate was subjected to cold rolling to be formed into a titanium plate having a thickness of 1 mm. Thereafter, as annealing treatment, the titanium plate was subjected to heat treatment in which the titanium plate was heated to 670° C. and retained for 180 minutes in vacuum or in an inert gas atmosphere to thereby fabricate a titanium product. This process will now be described in further detail taking Test No. 1 as an example.

In Test No. 1, a lower limit value 0 of X was calculated based on an analysis result of 0.023% for the Cl amount of the titanium sponge. The thickness of the titanium product was 1 mm, and the target X value was set as 0.75 in consideration of the occurrence of surface defects and the like. A target value of 17.2 mm for the actual thickness D of the titanium lump excluding pores and a target value of 13.3 mm for the thickness Ts of the outer layer packaging material were provisionally determined based on constraints such as the target X value and slab dimensions. The weight of each titanium lump was calculated based on the actual thickness D of the relevant titanium lump, and the required capacity of the titanium package was calculated based on the porosity when the titanium package was filled with titanium sponges, and the thickness within the titanium package (within the titanium packing body) was made 48.4 mm. A titanium packing body having a thickness of 75 mm was fabricated by using the aforementioned titanium lumps and titanium plates. The thickness of a surface layer portion and an inner layer portion of a titanium product produced by performing hot rolling, cold rolling and the like were measured. The thicknesses were 0.303 mm and 0.398 mm, respectively, and the X value was 0.76. It was confirmed that a titanium product that was substantially close to the target X of 0.75 could be produced.

Note that, in Test No. 15, when fabricating the titanium packing body, the thicknesses were changed between the bottom face and top face so that the respective thicknesses of the two surface layer portions of the titanium product were 0.24 mm and 0.33 mm.

[Chemical Composition]

The chemical compositions of the surface layer portion and the inner layer portion were measured in conformity with JIS H 1612 (1993), JIS H 1614 (1995), JIS H 1615 (1997), JIS H 1617 (1995), JIS H 1619 (2012) and JIS H 1620 (1995). Note that, at such time, if the thickness of the surface layer portion or the inner layer portion was 0.2 to 0.1 mm, analysis of the chemical composition of the relevant portion was performed using machined chips or the like obtained by processing such as cutting. If the thickness of the surface layer portion or the inner layer portion was less than 0.1 mm, the chemical composition of the relevant portion was calculated based on the analysis result for the chemical composition of the overall titanium product and the analysis result for the chemical composition of the thicker portion (inner layer portion or surface layer portion).

[Thickness Measurement]

Measurement of the respective thicknesses of the surface layer portion and inner layer portion was performed by microstructure observation using an optical microscope. First, a cross-section of the fabricated titanium product was embedded in a resin so as to enable observation, and after subjecting the cross-section to polishing and etching, an optical micrograph of the cross-section was taken. As illustrated in FIG. 2, boundary lines can be clearly observed between the surface layer portions and inner layer portion. In addition, since differences in gradation after etching which are caused by differences in the grain diameters and the like can be seen, the boundaries can also be distinguished by means of the differences in gradation.

The thicknesses of the surface layer portion and inner layer portion were measured based on cross-sectional photographs taken at 20 locations that were randomly selected, an average value was determined for each portion, and the thickness of the surface layer portion/thickness of the inner layer portion was calculated based on the average thicknesses for the surface layer portion and inner layer portion that were measured.

[Porosity]

The porosity of the inner layer portion of the titanium product was determined as follows. First, a sample for observation was cut out from a center part of the plate thickness of the inner layer portion. The sample for observation that was cut out was then embedded in a resin in a manner such that a cross-section perpendicular to the longitudinal direction of the titanium product became the surface to be observed, and thereafter the surface to be observed was buffed and mirror-finished using a diamond or alumina suspension. An optical micrograph of the mirror-finished surface to be observed was then taken.

The area of a pores portion included in the obtained optical micrograph was measured, and the porosity was determined by dividing the resultant value by the area of the entire photographing visual field. At such time, the imaging by means of the optical microscope was performed so that the observation area was 0.3 $mm^2$ or more in total (20 visual fields or more in optical micrographs at 500× magnification), and the average value thereof was adopted.

[Mechanical Properties]

A tensile test material (JIS 13 B tensile test specimen) in which a parallel portion with respect to the rolling direction was 12.5×60 mm (thickness=plate thickness), a distance between gauge points was 50 mm, a chuck portion was 20 mm in width and an overall length was 150 mm was cut out from the fabricated titanium product, and a tensile test for the flat plate was performed in accordance with JIS Z 2241 (2011) (Metallic materials—Tensile testing—Method of test at room temperature), and the ductility was evaluated by means of the total elongation. Note that, in the present example, the test material was judged to be excellent in ductility if the total elongation was 20% or more.

Further, strip specimens having a width of 20 mm and a length of 50 mm in parallel to the rolling direction were cut out from the fabricated titanium products having a thickness of 1 mm, and a flat plate 180° bending test (diameter on inner bending side was plate thickness) was performed in accordance with JIS Z 2248 (2014) (Metallic materials—Bend test), and the bendability was evaluated based on the presence or absence of crack occurrence, and specimens without cracks were indicated by "○" and specimens with cracks were indicated by "x".

The results of the above tests are shown in Tables 1 and 2.

TABLE 1

| | Titanium packing body | | | | | | | | |
|---|---|---|---|---|---|---|---|---|---|
| | Titanium sponge | | | Outer layer packaging material | | | | | |
| | Chemical composition (mass %) | | | Chemical composition (mass %) | | | | | Degree of vacuum |
| Test No. | O | Fe | Cl | O | Fe | Cl | Thickness (mm) | Thickness (mm) | (Pa) |
| 1 | 0.04 | 0.03 | 0.023 | 0.05 | 0.04 | 0.020 | 13.3 | 75 | $7.1 \times 10^{-2}$ |
| 2 | 0.04 | 0.03 | 0.025 | 0.05 | 0.04 | 0.020 | 11.6 | 75 | $1.5 \times 10^{-1}$ |
| 3 | 0.04 | 0.04 | 0.028 | 0.05 | 0.04 | 0.020 | 0.6 | 75 | $6.7 \times 10^{-2}$ |
| 4 | 0.05 | 0.03 | 0.031 | 0.05 | 0.04 | 0.020 | 2.9 | 75 | $4.8 \times 10^{-2}$ |
| 5 | 0.05 | 0.04 | 0.033 | 0.05 | 0.04 | 0.020 | 5.7 | 75 | $4.1 \times 10^{-2}$ |
| 6 | 0.05 | 0.04 | 0.035 | 0.05 | 0.04 | 0.020 | 9.2 | 75 | $5.9 \times 10^{-2}$ |
| 7 | 0.05 | 0.04 | 0.038 | 0.05 | 0.04 | 0.020 | 11.4 | 75 | $9.2 \times 10^{-3}$ |
| 8 | 0.05 | 0.04 | 0.040 | 0.05 | 0.04 | 0.020 | 13.4 | 75 | $2.3 \times 10^{-2}$ |
| 9 | 0.05 | 0.03 | 0.055 | 0.04 | 0.03 | 0.009 | 18.2 | 75 | $5.8 \times 10^{-2}$ |
| 10 | 0.05 | 0.05 | 0.061 | 0.04 | 0.03 | 0.009 | 20.5 | 75 | $6.6 \times 10^{-2}$ |
| 11 | 0.06 | 0.03 | 0.081 | 0.04 | 0.03 | 0.009 | 24.8 | 75 | $3.4 \times 10^{-2}$ |
| 12 | 0.06 | 0.04 | 0.135 | 0.04 | 0.03 | 0.009 | 30.2 | 75 | $5.1 \times 10^{-2}$ |
| 13 | 0.06 | 0.05 | 0.332 | 0.04 | 0.03 | 0.009 | 34.6 | 75 | $6.4 \times 10^{-2}$ |

TABLE 1-continued

| | Titanium packing body | | | | | | | | |
|---|---|---|---|---|---|---|---|---|---|
| | Titanium sponge | | | Outer layer packaging material | | | | | |
| | Chemical composition (mass %) | | | Chemical composition (mass %) | | | | | Degree of vacuum |
| Test No. | O | Fe | Cl | O | Fe | Cl | Thickness (mm) | Thickness (mm) | (Pa) |
| 14 | 0.06 | 0.05 | 0.502 | 0.04 | 0.03 | 0.009 | 35.5 | 75 | $3.6 \times 10^{-2}$ |
| 15 | 0.05 | 0.04 | 0.038 | 0.04 | 0.03 | 0.009 | 10.3/14.0 | 75 | $4.5 \times 10^{-2}$ |
| 16 | 0.05 | 0.04 | 0.038 | 0.05 | 0.04 | 0.020 | 0.6 | 75 | $4.6 \times 10^{-2}$ |
| 17 | 0.05 | 0.04 | 0.038 | 0.05 | 0.04 | 0.020 | 2.9 | 75 | $6.6 \times 10^{-2}$ |
| 18 | 0.05 | 0.04 | 0.041 | 0.05 | 0.04 | 0.020 | 5.5 | 75 | $8.2 \times 10^{-2}$ |
| 19 | 0.05 | 0.04 | 0.050 | 0.05 | 0.04 | 0.020 | 9.1 | 75 | $4.9 \times 10^{-2}$ |
| 20 | 0.05 | 0.04 | 0.050 | 0.05 | 0.04 | 0.020 | 11.6 | 75 | $4.3 \times 10^{-2}$ |
| 21 | 0.05 | 0.04 | 0.050 | 0.05 | 0.04 | 0.020 | 13.3 | 75 | $5.3 \times 10^{-2}$ |
| 22 | 0.05 | 0.03 | 0.048 | 0.05 | 0.04 | 0.020 | 0.6 | 75 | $8.2 \times 10^{-3}$ |
| 23 | 0.05 | 0.05 | 0.053 | 0.05 | 0.04 | 0.020 | 2.9 | 75 | $7.5 \times 10^{-2}$ |
| 24 | 0.05 | 0.05 | 0.058 | 0.05 | 0.04 | 0.020 | 5.5 | 75 | $1.1 \times 10^{-1}$ |
| 25 | 0.05 | 0.04 | 0.062 | 0.05 | 0.04 | 0.020 | 9.1 | 75 | $6.5 \times 10^{-2}$ |
| 26 | 0.05 | 0.05 | 0.065 | 0.05 | 0.04 | 0.020 | 11.5 | 75 | $4.5 \times 10^{-2}$ |
| 27 | 0.05 | 0.05 | 0.065 | 0.05 | 0.04 | 0.020 | 13.4 | 75 | $6.6 \times 10^{-2}$ |
| 28 | 0.06 | 0.05 | 0.092 | 0.05 | 0.04 | 0.020 | 0.6 | 75 | $5.9 \times 10^{-2}$ |
| 29 | 0.06 | 0.05 | 0.094 | 0.05 | 0.04 | 0.020 | 3.1 | 75 | $9.7 \times 10^{-2}$ |
| 30 | 0.06 | 0.05 | 0.095 | 0.05 | 0.04 | 0.020 | 5.9 | 75 | $3.2 \times 10^{-2}$ |
| 31 | 0.06 | 0.05 | 0.095 | 0.05 | 0.04 | 0.020 | 9.5 | 75 | $4.4 \times 10^{-2}$ |
| 32 | 0.05 | 0.03 | 0.055 | 0.04 | 0.03 | 0.009 | 14.5 | 75 | $8.1 \times 10^{-2}$ |
| 33 | 0.05 | 0.05 | 0.061 | 0.04 | 0.03 | 0.009 | 17.0 | 75 | $4.4 \times 10^{-2}$ |
| 34 | 0.06 | 0.03 | 0.081 | 0.04 | 0.03 | 0.009 | 22.3 | 75 | $5.8 \times 10^{-2}$ |
| 35 | 0.06 | 0.04 | 0.135 | 0.04 | 0.03 | 0.009 | 27.2 | 75 | $5.4 \times 10^{-2}$ |
| 36 | 0.06 | 0.05 | 0.332 | 0.04 | 0.03 | 0.009 | 30.6 | 75 | $2.9 \times 10^{-2}$ |
| 37 | 0.06 | 0.05 | 0.502 | 0.04 | 0.03 | 0.009 | 31.9 | 75 | $7.6 \times 10^{-2}$ |

TABLE 2

| | Titanium product | | | | | | | | | | | | | |
|---|---|---|---|---|---|---|---|---|---|---|---|---|---|---|
| | Inner layer portion | | | | | | | Surface layer portion | | | | | | |
| | Chemical composition (mass %, the balance: Ti and impurities) | | | | | | Thickness | Chemical composition (mass %, the balance: Ti and impurities) | | | | | | Thickness |
| Test No. | O | Fe | Cl | C | N | H | (mm) | O | Fe | Cl | C | N | H | (mm) |
| 1 | 0.04 | 0.03 | 0.023 | 0.003 | 0.001 | 0.001 | 0.40 | 0.05 | 0.04 | 0.020 | 0.004 | 0.001 | 0.003 | 0.30 |
| 2 | 0.04 | 0.03 | 0.025 | 0.002 | 0.001 | 0.001 | 0.45 | 0.05 | 0.04 | 0.020 | 0.004 | 0.001 | 0.003 | 0.28 |
| 3 | 0.04 | 0.04 | 0.028 | 0.003 | 0.001 | 0.001 | 0.98 | 0.05 | 0.04 | 0.020 | 0.004 | 0.001 | 0.003 | 0.01 |
| 4 | 0.05 | 0.03 | 0.031 | 0.004 | 0.001 | 0.001 | 0.82 | 0.05 | 0.04 | 0.020 | 0.004 | 0.001 | 0.003 | 0.09 |
| 5 | 0.05 | 0.04 | 0.033 | 0.003 | 0.001 | 0.001 | 0.68 | 0.05 | 0.04 | 0.020 | 0.004 | 0.001 | 0.003 | 0.16 |
| 6 | 0.05 | 0.04 | 0.035 | 0.004 | 0.001 | 0.001 | 0.53 | 0.05 | 0.04 | 0.020 | 0.004 | 0.001 | 0.003 | 0.23 |
| 7 | 0.05 | 0.04 | 0.038 | 0.004 | 0.001 | 0.001 | 0.45 | 0.05 | 0.04 | 0.020 | 0.004 | 0.001 | 0.003 | 0.27 |
| 8 | 0.05 | 0.04 | 0.040 | 0.003 | 0.001 | 0.001 | 0.39 | 0.05 | 0.04 | 0.020 | 0.004 | 0.001 | 0.003 | 0.30 |
| 9 | 0.05 | 0.04 | 0.055 | 0.003 | 0.001 | 0.001 | 0.28 | 0.04 | 0.03 | 0.009 | 0.003 | 0.001 | 0.002 | 0.36 |
| 10 | 0.05 | 0.05 | 0.061 | 0.003 | 0.001 | 0.001 | 0.23 | 0.04 | 0.03 | 0.009 | 0.003 | 0.001 | 0.002 | 0.39 |
| 11 | 0.06 | 0.03 | 0.081 | 0.005 | 0.001 | 0.001 | 0.16 | 0.04 | 0.03 | 0.009 | 0.003 | 0.001 | 0.002 | 0.42 |
| 12 | 0.06 | 0.04 | 0.135 | 0.004 | 0.002 | 0.001 | 0.08 | 0.04 | 0.03 | 0.009 | 0.003 | 0.001 | 0.002 | 0.46 |
| 13 | 0.06 | 0.05 | 0.332 | 0.006 | 0.001 | 0.001 | 0.03 | 0.04 | 0.03 | 0.009 | 0.003 | 0.001 | 0.002 | 0.49 |
| 14 | 0.06 | 0.05 | 0.502 | 0.004 | 0.001 | 0.001 | 0.02 | 0.04 | 0.03 | 0.009 | 0.003 | 0.001 | 0.002 | 0.49 |
| 15 | 0.05 | 0.04 | 0.038 | 0.004 | 0.001 | 0.001 | 0.43 | 0.04 | 0.03 | 0.009 | 0.003 | 0.001 | 0.002 | 0.24/0.33 |
| 16 | 0.05 | 0.04 | 0.038 | 0.003 | 0.001 | 0.001 | 0.98 | 0.05 | 0.04 | 0.020 | 0.004 | 0.001 | 0.003 | 0.01 |
| 17 | 0.05 | 0.04 | 0.038 | 0.004 | 0.001 | 0.001 | 0.82 | 0.05 | 0.04 | 0.020 | 0.004 | 0.001 | 0.003 | 0.09 |
| 18 | 0.05 | 0.04 | 0.041 | 0.004 | 0.001 | 0.001 | 0.68 | 0.05 | 0.04 | 0.020 | 0.004 | 0.001 | 0.003 | 0.16 |
| 19 | 0.05 | 0.04 | 0.050 | 0.005 | 0.001 | 0.001 | 0.53 | 0.05 | 0.04 | 0.020 | 0.004 | 0.001 | 0.003 | 0.23 |
| 20 | 0.05 | 0.04 | 0.050 | 0.005 | 0.001 | 0.001 | 0.45 | 0.05 | 0.04 | 0.020 | 0.004 | 0.001 | 0.003 | 0.28 |
| 21 | 0.05 | 0.04 | 0.050 | 0.005 | 0.001 | 0.001 | 0.40 | 0.05 | 0.04 | 0.020 | 0.004 | 0.001 | 0.003 | 0.30 |
| 22 | 0.05 | 0.03 | 0.048 | 0.004 | 0.001 | 0.001 | 0.98 | 0.05 | 0.04 | 0.020 | 0.004 | 0.001 | 0.003 | 0.01 |
| 23 | 0.05 | 0.05 | 0.053 | 0.003 | 0.001 | 0.001 | 0.82 | 0.05 | 0.04 | 0.020 | 0.004 | 0.001 | 0.003 | 0.09 |
| 24 | 0.05 | 0.05 | 0.058 | 0.004 | 0.001 | 0.001 | 0.68 | 0.05 | 0.04 | 0.020 | 0.004 | 0.001 | 0.003 | 0.16 |
| 25 | 0.05 | 0.04 | 0.062 | 0.004 | 0.001 | 0.001 | 0.53 | 0.05 | 0.04 | 0.020 | 0.004 | 0.001 | 0.003 | 0.23 |
| 26 | 0.05 | 0.05 | 0.065 | 0.003 | 0.001 | 0.001 | 0.45 | 0.05 | 0.04 | 0.020 | 0.004 | 0.001 | 0.003 | 0.27 |
| 27 | 0.05 | 0.05 | 0.065 | 0.003 | 0.001 | 0.001 | 0.39 | 0.05 | 0.04 | 0.020 | 0.004 | 0.001 | 0.003 | 0.30 |
| 28 | 0.06 | 0.05 | 0.092 | 0.004 | 0.001 | 0.001 | 0.98 | 0.05 | 0.04 | 0.020 | 0.004 | 0.001 | 0.003 | 0.01 |
| 29 | 0.06 | 0.05 | 0.094 | 0.004 | 0.001 | 0.001 | 0.82 | 0.05 | 0.04 | 0.020 | 0.004 | 0.001 | 0.003 | 0.09 |
| 30 | 0.06 | 0.05 | 0.095 | 0.004 | 0.001 | 0.001 | 0.68 | 0.05 | 0.04 | 0.020 | 0.004 | 0.001 | 0.003 | 0.16 |
| 31 | 0.06 | 0.05 | 0.095 | 0.004 | 0.001 | 0.001 | 0.53 | 0.05 | 0.04 | 0.020 | 0.004 | 0.001 | 0.003 | 0.23 |

TABLE 2-continued

| 32 | 0.05 | 0.03 | 0.055 | 0.003 | 0.001 | 0.001 | 0.36 | 0.04 | 0.03 | 0.009 | 0.003 | 0.001 | 0.002 | 0.32 |
| 33 | 0.05 | 0.05 | 0.061 | 0.003 | 0.001 | 0.001 | 0.30 | 0.04 | 0.03 | 0.009 | 0.003 | 0.001 | 0.002 | 0.35 |
| 34 | 0.06 | 0.03 | 0.081 | 0.005 | 0.001 | 0.001 | 0.20 | 0.04 | 0.03 | 0.009 | 0.003 | 0.001 | 0.002 | 0.40 |
| 35 | 0.06 | 0.04 | 0.135 | 0.004 | 0.002 | 0.001 | 0.12 | 0.04 | 0.03 | 0.009 | 0.003 | 0.001 | 0.002 | 0.44 |
| 36 | 0.06 | 0.05 | 0.332 | 0.006 | 0.001 | 0.001 | 0.08 | 0.04 | 0.03 | 0.009 | 0.003 | 0.001 | 0.002 | 0.46 |
| 37 | 0.06 | 0.05 | 0.502 | 0.004 | 0.001 | 0.001 | 0.06 | 0.04 | 0.03 | 0.009 | 0.003 | 0.001 | 0.002 | 0.47 |

| Test No. | Titanium product | | | | | |
|---|---|---|---|---|---|---|
| | Surface layer portion thickness inner layer portion thickness | Right-hand value of formula (i) | Porosity of inner layer portion (%) | Elongation (%) | Bendability | |
| 1 | 0.76 | 0.045 | 0.1 | 54 | ○ | Inventive |
| 2 | 0.62 | 0.042 | 0.1 | 53 | ○ | Example |
| 3 | 0.01 | 0.030 | 0.1 | 50 | ○ | |
| 4 | 0.11 | 0.032 | 0.1 | 49 | ○ | |
| 5 | 0.24 | 0.035 | 0.1 | 50 | ○ | |
| 6 | 0.44 | 0.039 | 0.1 | 51 | ○ | |
| 7 | 0.60 | 0.042 | 0.1 | 51 | ○ | |
| 8 | 0.77 | 0.045 | 0.1 | 50 | ○ | |
| 9 | 1.30 | 0.056 | 0.1 | 54 | ○ | |
| 10 | 1.67 | 0.063 | 0.2 | 51 | ○ | |
| 11 | 2.71 | 0.084 | 0.4 | 53 | ○ | |
| 12 | 5.75 | 0.145 | 0.9 | 50 | ○ | |
| 13 | 16.17 | 0.353 | 1.5 | 52 | ○ | |
| 14 | 24.50 | 0.520 | 1.9 | 50 | ○ | |
| 15 | 0.56 (= 0.24/0.43) | 0.041 | 0.2 | 52 | ○ | |
| 16 | 0.01 | <u>0.030</u> | 0.1 | 47 | x | Comparative |
| 17 | 0.11 | <u>0.032</u> | 0.1 | 45 | x | Example |
| 18 | 0.23 | <u>0.035</u> | 0.1 | 46 | x | |
| 19 | 0.44 | <u>0.039</u> | 0.1 | 49 | x | |
| 20 | 0.62 | <u>0.042</u> | 0.2 | 49 | x | |
| 21 | 0.76 | <u>0.045</u> | 0.2 | 48 | x | |
| 22 | 0.01 | <u>0.030</u> | 0.1 | 45 | x | |
| 23 | 0.11 | <u>0.032</u> | 0.2 | 41 | x | |
| 24 | 0.23 | <u>0.035</u> | 0.2 | 42 | x | |
| 25 | 0.44 | <u>0.039</u> | 0.2 | 46 | x | |
| 26 | 0.61 | <u>0.042</u> | 0.3 | 44 | x | |
| 27 | 0.77 | <u>0.045</u> | 0.4 | 47 | x | |
| 28 | 0.01 | <u>0.030</u> | 8.1 | 7 | x | |
| 29 | 0.11 | <u>0.032</u> | 7.5 | 7 | x | |
| 30 | 0.24 | <u>0.035</u> | 5.9 | 12 | x | |
| 31 | 0.44 | <u>0.039</u> | 6.1 | 8 | x | |
| 32 | 0.87 | <u>0.047</u> | 0.1 | 28 | x | |
| 33 | 1.14 | <u>0.053</u> | 0.3 | 37 | x | |
| 34 | 2.03 | <u>0.071</u> | 0.6 | 41 | x | |
| 35 | 3.65 | <u>0.103</u> | 0.9 | 47 | x | |
| 36 | 6.08 | <u>0.152</u> | 1.2 | 45 | x | |
| 37 | 7.83 | <u>0.187</u> | 1.4 | 43 | x | |

$Cl_I \leq 0.03 + 0.02 \times t_S/t_I \ldots$ (i)

Test Nos. 1 to 15 in Tables 1 and 2 are Inventive Examples that satisfy all of the conditions defined by the present invention. In each of Test Nos. 1 to 15, since the percentage content of Cl in the inner layer portion was 0.60% or less and formula (i) was satisfied, and furthermore a condition that the volume ratio of pores was 30% or less was satisfied, the results showed that the test specimens of Test Nos. 1 to 15 were excellent in ductility and bendability.

In contrast, Test Nos. 16 to 37 are Comparative Examples that did not satisfy the conditions defined by the present invention. In these Comparative Examples, although the Cl percentage content of the inner layer portion was 0.60% or less, since formula (i) was not satisfied, the ductility and bendability were poor.

Figure 7:
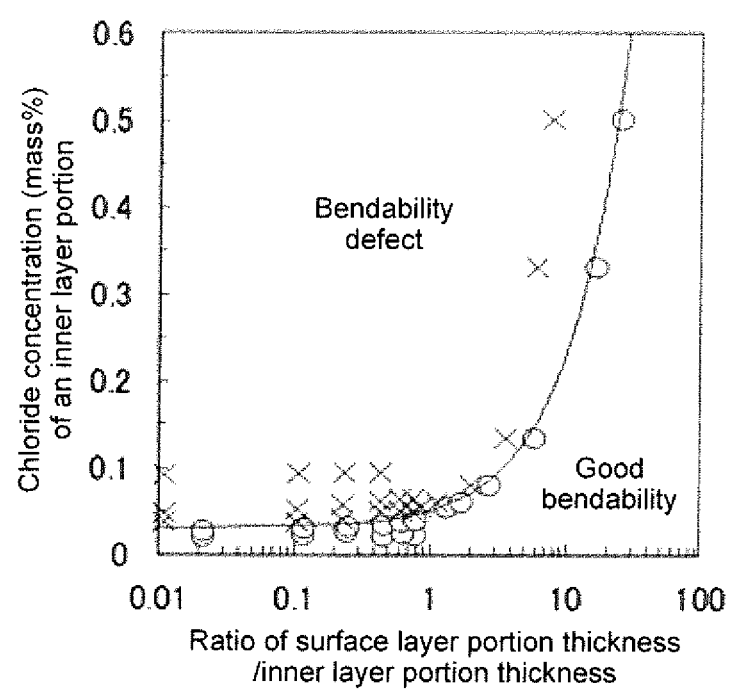
FIG. 7 is a view illustrating the relation between a ratio of surface layer portion thickness/inner layer portion thickness and a chloride concentration (mass %) of an inner layer portion.

In FIG. 7, with regard to bendability, the Inventive Examples are indicated by "○", and the Comparative Examples are indicated by "x". In the Inventive Examples, even if the chloride concentration of the inner layer portion was high, the bendability was good. Thus, a deterioration in mechanical properties attributable to Cl is prevented by appropriately controlling the surface layer portion thickness and the inner layer portion thickness.

Example 2

[Test Material Fabricating Process]

A titanium package was filled with titanium sponge (Cl: 0.025%, average grain diameter=0.25 to 19 mm) produced by the Kroll process. Further, as the outer layer packaging material, a titanium packing body having a thickness of 39 to 148 mm, a width of 100 mm, and a length of 120 mm was fabricated by the same production method as that adopted in Example 1 using titanium plates (JIS Class 1) having a thickness of 4.0 mm.

Next, after heating the titanium packing body 4 at 850° C. in an air atmosphere, the titanium packing body was subjected to hot rolling to form a hot-rolled plate having a thickness of 20 mm. Thereafter, both surfaces of the hot-rolled plate were subjected to a descaling treatment in which about 50 μm was removed per side (100 μm for both surfaces) using shotblast and nitric-hydrofluoric acid to fabricate a titanium product.

Thereafter, by the same evaluation methods as employed in Example 1, the chemical compositions and thicknesses of the surface layer portion and the inner layer portion, and the mechanical properties of the titanium product were investigated. Note that, in the present example a test specimen was judged to be excellent in ductility if the total elongation was 20% or more. In addition, the surface texture of the titanium product was visually observed and the presence or absence of surface cracking was evaluated. Test specimens in which no cracking was present were indicated by "○", and test specimens in which cracking was present were indicated by "x". Note that, in JIS H 4600 (2012), it is stated that a bending test is not required for titanium products having a plate thickness of 5 mm or more, and therefore in the present example a bending test was not performed for titanium products having such a plate thickness.

The results of the above tests are shown in Tables 3 and 4.

Test Nos. 38 to 42 in Tables 3 and 4 are Inventive Examples that satisfy all of the conditions defined by the present invention. In Test Nos. 38 to 42, since the percentage content of Cl in the inner layer portion was 0.60% or less and formula (i) was satisfied, and furthermore a condition that the volume ratio of pores was 30% or less was satisfied, the results showed that the test specimens of Test Nos. 38 to 42 had good surface texture and were excellent in ductility.

Example 3

[Test Material Fabricating Process]

Titanium sponge (Cl: 0.028 to 0.052%, average grain diameter 0.25 to 19 mm) produced by the Kroll process was inserted into a die and compressively pressed to be formed into briquettes having a bulk density of 3.2 g/cm$^3$.

After cutting the briquettes into a rectangular parallelepiped shape, the briquettes were packaged in titanium plates (JIS Class 1 to 4) having a thickness of 10 mm, and thereafter titanium packaging bodies having a thickness of

TABLE 3

| | Titanium packing body | | | | | | | | |
|---|---|---|---|---|---|---|---|---|---|
| | Titanium sponge | | | Outer layer packaging material | | | | | |
| Test No. | Chemical composition (mass %) | | | Chemical composition (mass %) | | | Thickness (mm) | Thickness (mm) | Degree of vacuum (Pa) |
| | O | Fe | Cl | O | Fe | Cl | | | |
| 38 | 0.04 | 0.03 | 0.025 | 0.05 | 0.04 | 0.02 | 4.0 | 39 | $4.4 \times 10^{-2}$ |
| 39 | 0.04 | 0.03 | 0.025 | 0.05 | 0.04 | 0.02 | 4.0 | 50 | $6.5 \times 10^{-2}$ |
| 40 | 0.04 | 0.03 | 0.025 | 0.05 | 0.04 | 0.02 | 4.0 | 62 | $8.6 \times 10^{-3}$ |
| 41 | 0.04 | 0.03 | 0.025 | 0.05 | 0.04 | 0.02 | 4.0 | 94 | $1.4 \times 10^{-2}$ |
| 42 | 0.04 | 0.03 | 0.025 | 0.05 | 0.04 | 0.02 | 4.0 | 148 | $7.8 \times 10^{-2}$ |

TABLE 4

| | Titanium product | | | | | | | | | | | | | |
|---|---|---|---|---|---|---|---|---|---|---|---|---|---|---|
| | Inner layer portion | | | | | | | Surface layer portion | | | | | | |
| Test No. | Chemical composition (mass %, the balance: Ti and impurities) | | | | | | Thickness (mm) | Chemical composition (mass %, the balance: Ti and impurities) | | | | | | Thickness (mm) |
| | O | Fe | Cl | C | N | H | | O | Fe | Cl | C | N | H | |
| 38 | 0.04 | 0.03 | 0.025 | 0.002 | 0.001 | 0.001 | 12.2 | 0.05 | 0.04 | 0.02 | 0.004 | 0.001 | 0.003 | 3.9 |
| 39 | 0.04 | 0.03 | 0.025 | 0.002 | 0.001 | 0.001 | 13.4 | 0.05 | 0.04 | 0.02 | 0.004 | 0.001 | 0.003 | 3.3 |
| 40 | 0.04 | 0.03 | 0.025 | 0.002 | 0.001 | 0.001 | 14.2 | 0.05 | 0.04 | 0.02 | 0.004 | 0.001 | 0.003 | 2.8 |
| 41 | 0.04 | 0.03 | 0.025 | 0.002 | 0.001 | 0.001 | 15.9 | 0.05 | 0.04 | 0.02 | 0.004 | 0.001 | 0.003 | 2.0 |
| 42 | 0.04 | 0.03 | 0.025 | 0.002 | 0.001 | 0.001 | 17.2 | 0.05 | 0.04 | 0.02 | 0.004 | 0.001 | 0.003 | 1.4 |

| | Titanium product | | | | | |
|---|---|---|---|---|---|---|
| Test No. | Surface layer portion thickness/ inner layer portion thickness | Right-hand value of formula (i) | Porosity of inner layer portion (%) | Surface texture | Elongation (%) | |
| 38 | 0.32 | 0.036 | 13.5 | ○ | 24 | Inventive Example |
| 39 | 0.24 | 0.035 | 9.2 | ○ | 33 | |
| 40 | 0.20 | 0.034 | 2.1 | ○ | 38 | |
| 41 | 0.13 | 0.033 | 0.9 | ○ | 40 | |
| 42 | 0.08 | 0.032 | 0.5 | ○ | 45 | |

$Cl_I \leq 0.03 + 0.02 \times t_S/t_I \ldots$ (i)

28 to 84 mm, a width of 100 mm and a length of 120 mm were fabricated by the same production method as in Example 1.

Next, by the same production method as in Example 1, each titanium packing body was subjected to hot rolling, descaling, cold rolling, and annealing treatment to fabricate a titanium product.

In relation to Test No. 55, a hole was made in advance in an end portion of one of the outer layer packaging materials, and a copper pipe was solder-welded thereto. The entire packing body was assembled, and seams of the entire circumference of the outer layer packaging material were arc welded in an Ar gas atmosphere to thereby assemble a titanium packing body. Thereafter, the degree of vacuum inside the titanium packing body was reduced to 15 Pa through the copper pipe, after which the copper pipe was hermetically sealed to fabricate a titanium packing body.

Thereafter, hot rolling and cold rolling were performed similarly to the foregoing Examples, and a titanium product was obtained.

Thereafter, by the same evaluation methods as employed in Example 1, the chemical compositions and thicknesses of the surface layer portion and the inner layer portion, and the mechanical properties of the titanium product were investigated. Note that, in the present example also, a test specimen was judged to be excellent in ductility if the total elongation was 20% or more. In addition, the surface texture of the titanium product was visually observed and the presence or absence of surface cracking was evaluated. Test specimens in which no cracking was present were indicated by "○", and test specimens in which cracking was present were indicated by "x".

The results of the above tests are shown in Tables 5 and 6.

TABLE 5

| | Titanium packing body | | | | | | | | |
|---|---|---|---|---|---|---|---|---|---|
| | Titanium sponge | | | Outer layer packaging material | | | | | |
| | Chemical composition (mass %) | | | Chemical composition (mass %) | | | Thickness | Thickness | Degree of vacuum |
| Test No. | O | Fe | Cl | O | Fe | Cl | (mm) | (mm) | (Pa) |
| 43 | 0.04 | 0.04 | 0.028 | 0.05 | 0.04 | 0.020 | 10 | 78 | $4.4 \times 10^{-2}$ |
| 44 | 0.12 | 0.1 | 0.031 | 0.13 | 0.11 | 0.020 | 10 | 82 | $1.4 \times 10^{-2}$ |
| 45 | 0.16 | 0.14 | 0.031 | 0.16 | 0.14 | 0.020 | 10 | 83 | $6.5 \times 10^{-2}$ |
| 46 | 0.29 | 0.28 | 0.03 | 0.29 | 0.27 | 0.020 | 10 | 84 | $8.8 \times 10^{-2}$ |
| 47 | 0.05 | 0.04 | 0.05 | 0.05 | 0.04 | 0.020 | 10 | 31 | $3.5 \times 10^{-2}$ |
| 48 | 0.11 | 0.1 | 0.05 | 0.12 | 0.1 | 0.020 | 10 | 32 | $2.7 \times 10^{-2}$ |
| 49 | 0.17 | 0.15 | 0.052 | 0.17 | 0.16 | 0.020 | 10 | 28 | $5.9 \times 10^{-2}$ |
| 50 | 0.29 | 0.27 | 0.051 | 0.29 | 0.26 | 0.020 | 10 | 28 | $6.1 \times 10^{-2}$ |
| 51 | 0.05 | 0.04 | 0.051 | 0.05 | 0.04 | 0.020 | 10 | 78 | $3.5 \times 10^{-2}$ |
| 52 | 0.11 | 0.1 | 0.05 | 0.12 | 0.1 | 0.020 | 10 | 82 | $2.7 \times 10^{-2}$ |
| 53 | 0.17 | 0.15 | 0.052 | 0.17 | 0.16 | 0.020 | 10 | 83 | $5.9 \times 10^{-2}$ |
| 54 | 0.29 | 0.27 | 0.051 | 0.29 | 0.26 | 0.020 | 10 | 84 | $6.1 \times 10^{-2}$ |
| 55 | 0.04 | 0.04 | 0.028 | 0.05 | 0.04 | 0.020 | 10 | 74 | <u>15</u> |

TABLE 6

| | Titanium product | | | | | | | | | | | | | |
|---|---|---|---|---|---|---|---|---|---|---|---|---|---|---|
| | Inner layer portion | | | | | | | Surface layer portion | | | | | | |
| | Chemical composition (mass %, the balance: Ti and impurities) | | | | | | Thickness | Chemical composition (mass %, the balance: Ti and impurities) | | | | | | Thickness |
| Test No. | O | Fe | Cl | C | N | H | (mm) | O | Fe | Cl | C | N | H | (mm) |
| 43 | 0.04 | 0.04 | 0.028 | 0.005 | 0.001 | 0.001 | 0.68 | 0.05 | 0.04 | 0.020 | 0.004 | 0.001 | 0.003 | 0.16 |
| 44 | 0.12 | 0.1 | 0.031 | 0.004 | 0.002 | 0.001 | 0.70 | 0.13 | 0.11 | 0.020 | 0.004 | 0.001 | 0.002 | 0.15 |
| 45 | 0.16 | 0.14 | 0.031 | 0.005 | 0.005 | 0.001 | 0.70 | 0.16 | 0.14 | 0.020 | 0.004 | 0.002 | 0.003 | 0.15 |
| 46 | 0.29 | 0.28 | 0.030 | 0.006 | 0.006 | 0.001 | 0.71 | 0.29 | 0.27 | 0.020 | 0.006 | 0.002 | 0.003 | 0.15 |
| 47 | 0.05 | 0.04 | 0.050 | 0.005 | 0.001 | 0.001 | 0.28 | 0.05 | 0.04 | 0.020 | 0.004 | 0.001 | 0.003 | 0.36 |
| 48 | 0.11 | 0.1 | 0.050 | 0.004 | 0.002 | 0.001 | 0.30 | 0.12 | 0.1 | 0.020 | 0.004 | 0.001 | 0.002 | 0.35 |
| 49 | 0.17 | 0.15 | 0.052 | 0.005 | 0.005 | 0.001 | 0.23 | 0.17 | 0.16 | 0.020 | 0.004 | 0.002 | 0.003 | 0.39 |
| 50 | 0.29 | 0.27 | 0.051 | 0.006 | 0.006 | 0.001 | 0.22 | 0.29 | 0.26 | 0.020 | 0.006 | 0.002 | 0.003 | 0.39 |
| 51 | 0.05 | 0.04 | 0.051 | 0.005 | 0.001 | 0.001 | 0.68 | 0.05 | 0.04 | 0.020 | 0.004 | 0.001 | 0.003 | 0.16 |
| 52 | 0.11 | 0.1 | 0.050 | 0.004 | 0.002 | 0.001 | 0.70 | 0.12 | 0.1 | 0.020 | 0.004 | 0.001 | 0.002 | 0.15 |
| 53 | 0.17 | 0.15 | 0.052 | 0.005 | 0.005 | 0.001 | 0.70 | 0.17 | 0.16 | 0.020 | 0.004 | 0.002 | 0.003 | 0.15 |
| 54 | 0.29 | 0.27 | 0.051 | 0.006 | 0.006 | 0.001 | 0.71 | 0.29 | 0.26 | 0.020 | 0.006 | 0.002 | 0.003 | 0.15 |
| 55 | <u>0.52</u> | 0.04 | 0.028 | 0.005 | 0.001 | 0.001 | 0.68 | 0.05 | 0.04 | 0.020 | 0.004 | 0.001 | 0.003 | 0.16 |

TABLE 6-continued

| Test No. | Titanium product | | | | | | |
|---|---|---|---|---|---|---|---|
| | Surface layer portion thickness/ inner layer portion thickness | Right-hand value of formula (i) | Porosity of inner layer portion (%) | Surface texture | Elongation (%) | Bendability | |
| 43 | 0.23 | 0.035 | 0.1 | ○ | 50 | ○ | Inventive |
| 44 | 0.21 | 0.034 | 0.1 | ○ | 38 | ○ | Example |
| 45 | 0.21 | 0.034 | 0.1 | ○ | 30 | ○ | |
| 46 | 0.21 | 0.034 | 0.2 | ○ | 24 | ○ | |
| 47 | 1.26 | 0.055 | 0.1 | ○ | 52 | ○ | |
| 48 | 1.16 | 0.053 | 0.1 | ○ | 39 | ○ | |
| 49 | 1.69 | 0.064 | 0.2 | ○ | 32 | ○ | |
| 50 | 1.81 | 0.066 | 0.3 | ○ | 25 | ○ | |
| 51 | 0.23 | <u>0.035</u> | 0.2 | ○ | 45 | x | Comparative |
| 52 | 0.21 | <u>0.034</u> | 0.2 | ○ | 34 | x | Example |
| 53 | 0.21 | <u>0.034</u> | 0.3 | ○ | 27 | x | |
| 54 | 0.21 | <u>0.034</u> | 0.3 | ○ | 21 | x | |
| 55 | 0.24 | <u>0.035</u> | 4.6 | ○ | 12 | x | |

$Cl_I \leq 0.03 + 0.02 \times t_S/t_I$ ... (i)

Test Nos. 43 to 50 in Tables 5 and 6 are Inventive Examples that satisfied all of the conditions defined by the present invention. In Test Nos. 43 to 50, since the percentage content of Cl in the inner layer portion was 0.60% or less and formula (i) was satisfied, and furthermore a condition that the volume ratio of pores was 30% or less was satisfied, the results showed that the specimens of Test Nos. 43 to 50 had good surface texture and were excellent in ductility.

In Test Nos. 51 to 54, although the percentage content of Cl in the inner layer portion was 0.60% or less, formula (i) was not satisfied, and consequently the bendability of the specimens of Test Nos. 51 to 54 was poor.

In Test No. 55, although the surface texture was good, one part of the inner layer portion was oxidized and the O content was outside of the defined range, and consequently the ductility was low and the bendability was poor.

As described above, the titanium product according to the present invention is excellent in surface texture, elongation and bendability, and is suitable for use in a member for which high deformability is required, for example, a roofing tile.

REFERENCE SIGNS LIST

1 Titanium product
2 Surface layer portion
3 Inner layer portion
4 Titanium packing body
5 Outer layer packaging material
6 Titanium lump

The invention claimed is:

1. A titanium product comprising an inner layer portion and a surface layer portion, wherein:
a chemical composition of the surface layer portion consists, by mass %, of:
O: 0.40% or less,
Fe: 0.50% or less,
Cl: 0.020% or less,
N: 0.050% or less,
C: 0.080% or less,
H: 0.013% or less, and
the balance: Ti and impurities;
a porosity of the surface layer portion is less than 0.1%;
a chemical composition of the inner layer portion consists, by mass %, of:
O: 0.40% or less,
Fe: 0.50% or less,
Cl: more than 0.020 and not more than 0.60%,
N: 0.050% or less,
C: 0.080% or less,
H: 0.013% or less, and
the balance: Ti and impurities;
the inner layer portion has pores;
in a cross-section perpendicular to a longitudinal direction of the titanium product, an area fraction of the pores of the inner layer portion is more than 0% and not more than 5%, the area fraction of the pores being measured with an optical microscope at 500× magnification; and
the titanium product satisfies formula (i) below:

$$Cl_I \leq 0.03 + 0.02 \times t_S/t_I \qquad (i)$$

where, the meaning of each symbol in formula (i) above is as follows:
$Cl_I$: Cl content (mass %) of inner layer portion
$t_S$: thickness of surface layer portion
$t_I$: thickness of inner layer portion.

2. The titanium product according to claim 1, wherein a thickness of the titanium product is 100 mm or less.

3. The titanium product according to claim 1, wherein the area fraction of the pores of the inner layer portion is 0.1% or more.

4. The titanium product according to claim 1, further comprising a boundary between the surface layer portion and the inner layer portion, the boundary distinguishable by polishing and etching a cross-section of the titanium product perpendicular to a rolling direction of the titanium product.

5. A method for producing a titanium product, the titanium product being according to claim 1, comprising:
a step of fabricating a titanium package having a chemical composition consisting, by mass %, of,
O: 0.40% or less,
Fe: 030% or less,
Cl: 0,020% or less,
N: 0.050% or less,
C: 0,080% or less,
H: 0.013% or less, and
the balance: Ti and impurities;
a step of filling the titanium package with one or more types selected from titanium sponge and a briquette obtained by compressing the titanium sponge,
the titanium sponge having a chemical composition consisting, by mass %, of, O: 0.40% or less,
Fe: 0.50% or less,
Cl: more than 0.020 and not more than 0.60%,
N: 0.050% or less,
C: 0.080% or less,
H: 0.013% or less, and
the balance: Ti and impurities;
a step of making a degree of vacuum inside the titanium package 10 Pa or less, and thereafter hermetically sealing a circumference of the titanium package so that the degree of vacuum inside the titanium package is maintained, to thereby form a titanium packing body; and
a step of performing hot working on the titanium packing body.

6. The method for producing a titanium product according to claim 2, further comprising:
a step of performing cold working and annealing after the step of performing hot working.

* * * * *